United States Patent
Plude

(10) Patent No.: US 9,470,285 B2
(45) Date of Patent: Oct. 18, 2016

(54) AIRCRAFT DOOR DAMPENING SYSTEM

(71) Applicant: The Boeing Company, Chicago, IL (US)

(72) Inventor: Leo Walter Plude, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 41 days.

(21) Appl. No.: 14/247,549

(22) Filed: Apr. 8, 2014

(65) Prior Publication Data

US 2015/0284981 A1 Oct. 8, 2015

(51) Int. Cl.
*F16F 9/16* (2006.01)
*F16F 9/00* (2006.01)
*B64C 1/14* (2006.01)

(52) U.S. Cl.
CPC ............... *F16F 9/00* (2013.01); *B64C 1/1446* (2013.01); *Y10T 16/2788* (2015.01)

(58) Field of Classification Search
CPC ............ F16F 9/20; F16F 9/56; F16F 9/5126; F16K 15/00; B64C 1/00; B64C 1/14; B64C 1/1407
USPC .......... 188/282.8, 312, 313, 316; 267/33–35, 267/221
See application file for complete search history.

(56) References Cited

U.S. PATENT DOCUMENTS

| | | | | |
|---|---|---|---|---|
| 2,758,679 A * | 8/1956 | O'Connor et al. | ........... | 188/269 |
| 3,483,952 A * | 12/1969 | Cardwell | ........ | 188/289 |
| 4,633,758 A * | 1/1987 | Kedzierski | .......... | 91/44 |
| 5,219,414 A * | 6/1993 | Yamaoka | ........ | 188/284 |
| 5,662,046 A * | 9/1997 | Wright et al. | ........ | 105/167 |
| 5,682,966 A * | 11/1997 | Cabrerizo-Pariente | ....... | 188/269 |
| 5,687,452 A * | 11/1997 | Hamatani et al. | ........ | 16/82 |
| 7,743,895 B2 * | 6/2010 | Krawczyk | .......... | 188/282.8 |
| 2005/0067242 A1 * | 3/2005 | Vanmechelen et al. | . | 188/322.17 |
| 2009/0173402 A1 * | 7/2009 | Nalla | ............ | 137/528 |
| 2009/0314592 A1 | 12/2009 | Nygren | | |
| 2010/0059321 A1 * | 3/2010 | Boivin | .......... | 188/284 |
| 2012/0187640 A1 * | 7/2012 | Kondo et al. | .......... | 280/5.514 |
| 2013/0105259 A1 * | 5/2013 | Murakami | .......... | F16F 9/064 188/269 |
| 2013/0319804 A1 * | 12/2013 | Six | ............ | F16F 9/26 188/313 |

* cited by examiner

Primary Examiner — Christopher Schwartz

(74) Attorney, Agent, or Firm — Yee & Associates, P.C.

(57) ABSTRACT

A method and apparatus for dampening a structure in an aircraft. The apparatus comprises a housing, a first compartment located along an axis extending centrally through the housing, a second compartment located adjacent to the first compartment on the axis extending centrally through the housing, a first piston, a rod, and a second piston. The housing has an elongate shape. The first piston is located within the first compartment of the housing. The first piston defines a first chamber and a second chamber of the first compartment as the first piston moves within the housing. The rod is associated with the first piston and extends centrally through the first compartment and the second compartment. The second piston is coaxial to the first piston and located within the second compartment. The second piston moves relative to the rod to accommodate a flow of a fluid into the second compartment.

20 Claims, 25 Drawing Sheets

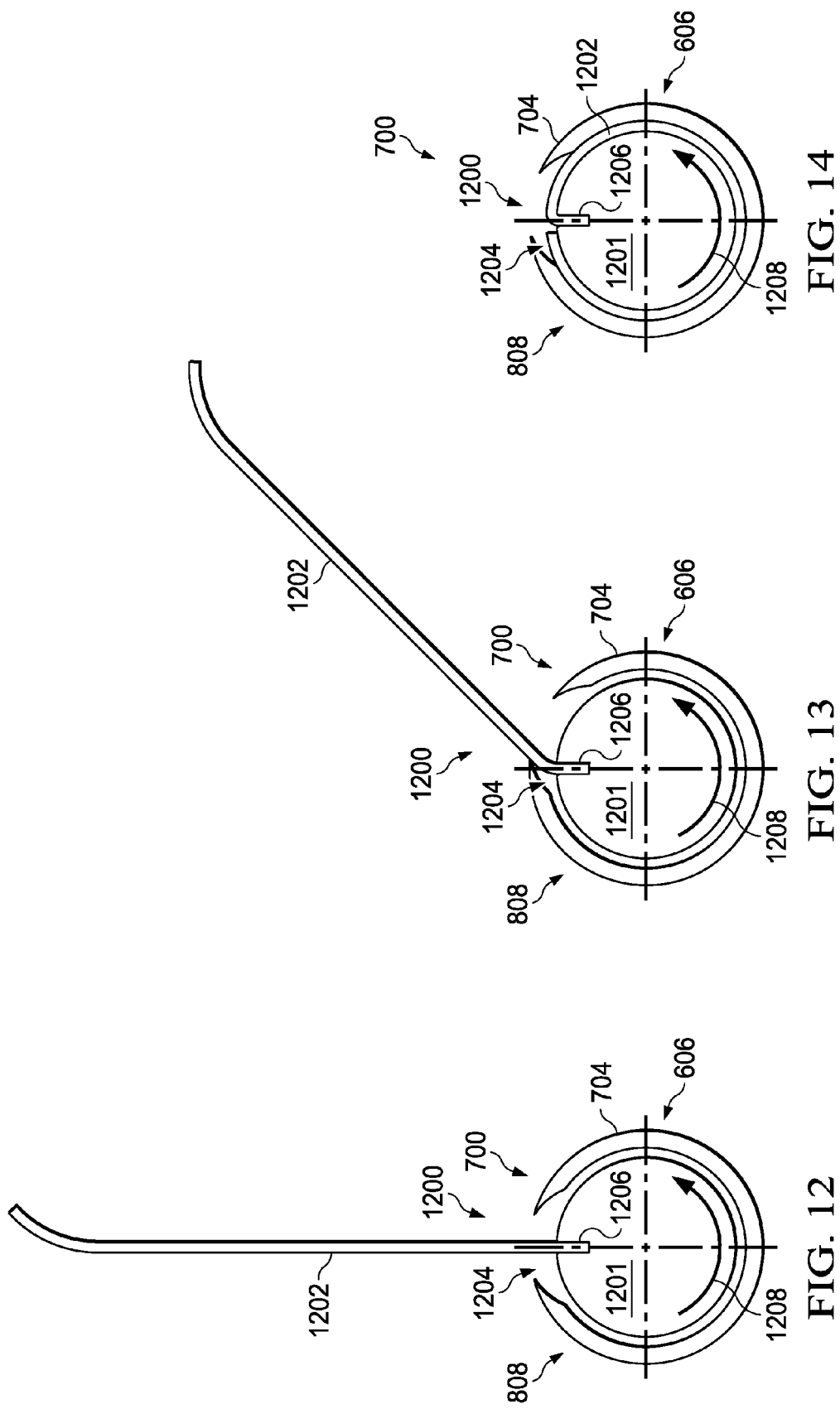

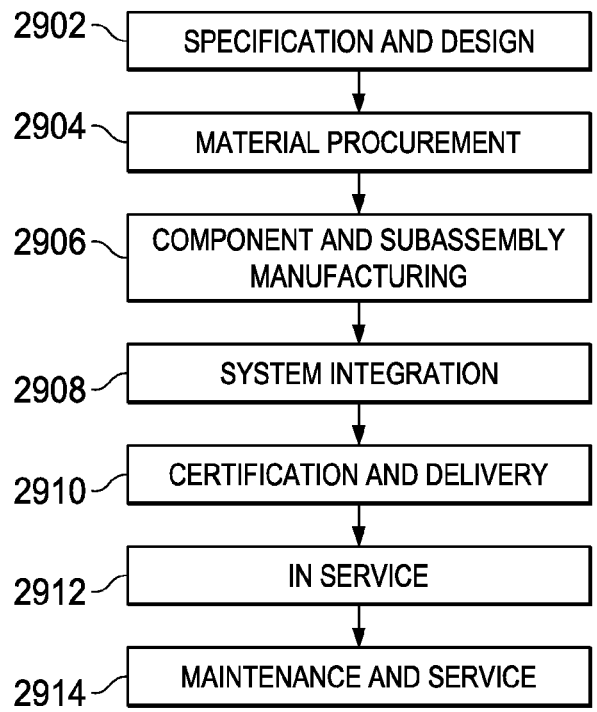
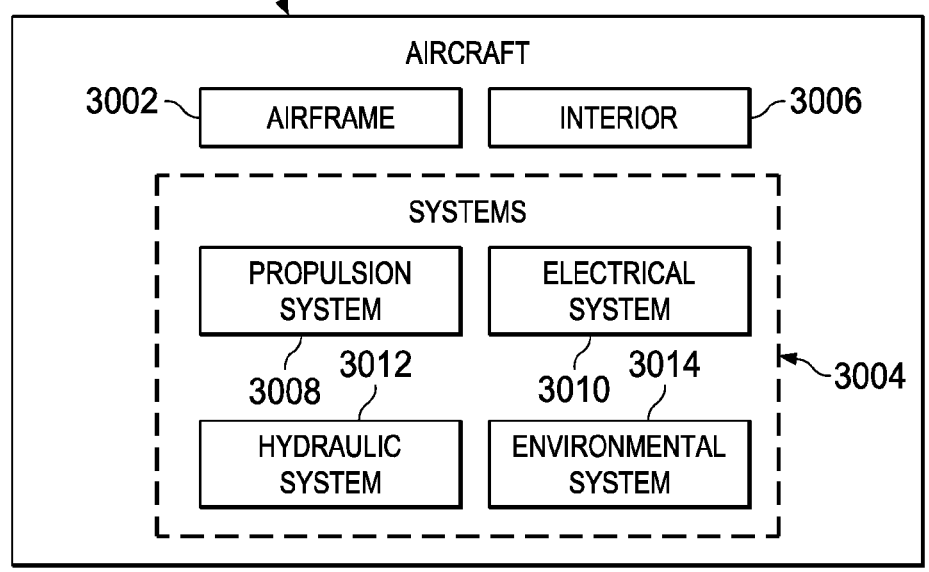

AIRCRAFT DOOR DAMPENING SYSTEM

BACKGROUND INFORMATION

1. Field

The present disclosure relates generally to aircraft and, in particular, to doors for aircraft. Still more particularly, the present disclosure relates to a method and apparatus for controlling the speed of a door of an aircraft.

2. Background

Mechanical devices are often used to control motion of various structures in an aircraft. These structures may be selected from one of a door, a hatch, a control surface, or other suitable types of structures. For example, mechanical devices may be used to control the speed at which a door to the aircraft opens and closes. This door may be an access door or may serve some other function.

An access door is a door that opens to expose a space in the aircraft. For example, an exterior access door may be opened to expose a bay. Structures stored in the bay may then be accessed by operators. In particular, operators may perform various operations on these structures including maintenance, replacement, recalibration, and other operations.

As an example, an access door is opened to provide maintenance access to refueling equipment on a tanker aircraft. In another example, an access door is opened to expose a bay containing electronic equipment.

These access doors may be opened or closed during ground operation of the aircraft. For instance, the access door may be opened when the aircraft is stationary at a gate.

When opening an access door, forces acting on the door may cause the door to open or close more quickly than desired. These forces may include wind. One or more mechanical devices are used to slow the opening and closing of the access door. Some mechanical devices, however, may take up more space than desired or may not slow the speed of the access door in a desired manner. Therefore, it would be desirable to have a method and apparatus that take into account at least some of the issues discussed above, as well as other possible issues.

SUMMARY

The embodiments of the disclosure provide a method and apparatus to control the speed of a door that opens to the exterior of an aircraft. A dampening system with an elongate housing is positioned between a door of the aircraft and a movement system configured to open and close the door. The elongate housing includes two compartments positioned adjacent to one another along a central axis.

A first piston is located within the first compartment and a second piston is located within the second compartment. The first piston is connected to a rod that extends longitudinally through the two compartments. The piston and the rod, collectively, may be referred to as a piston rod in this example.

As the door opens, the piston rod moves and hydraulic fluid flows from a first chamber in the first compartment to a second chamber in the first compartment. A flow regulator restricts fluid flow between the first chamber and the second chamber to prevent the door from opening more quickly than desired. Some hydraulic fluid flows through a restrictor-check valve from the second chamber to the second compartment as the door opens.

The second piston in the second compartment moves in response to the hydraulic fluid flowing into the second compartment. A spring in the second compartment applies a force to one end of the second piston to drive the hydraulic fluid back into the first compartment. The restrictor-check valve allows free flow of hydraulic fluid back into the second chamber.

As the door closes, hydraulic fluid flows from the second chamber to the first chamber through the flow regulator to prevent the door from closing faster than desired. Hydraulic fluid is forced into the second compartment but is restricted by the restrictor-check valve. At rest, fluid freely flows back into the second chamber to replenish the first compartment.

The second compartment also serves as a thermal compensation reservoir for the dampening system. As the hydraulic fluid expands and contracts in response to movement of the piston rod, environmental conditions, or both, hydraulic fluid flows through the restrictor-check valve between the first compartment and the second compartment. The second piston moves in response to this thermal expansion and contraction. The spring applies a force to the second piston to drive the hydraulic fluid back into the second chamber.

In addition, the second compartment serves as a reservoir for residual hydraulic fluid for the dampening system. As the dampening system experiences fluid loss required to keep the dynamic seals wet, the spring and the second piston move a portion of the residual fluid into the first compartment to continue desired operation of the dampening system. A fluid indicator shows the level of fluid in the second compartment when the dampening system is at rest.

The dampening system described herein reduces the speed of the door as the door opens and closes. The dampening system also provides a space-saving coaxial configuration of components, while compensating for fluid loss and allowing for thermal expansion and contraction of the hydraulic fluid. The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 12 is an illustration of installation of a retaining device in accordance with an illustrative embodiment;

FIG. 13 is an illustration of installation of a retaining device in accordance with an illustrative embodiment;

FIG. 14 is an illustration of installation of a retaining device in accordance with an illustrative embodiment;

FIG. 29 is an illustration of a block diagram of an aircraft manufacturing and service method in accordance with an illustrative embodiment; and FIG. 30 is an illustration of a block diagram of an aircraft in which an illustrative embodiment may be implemented.

DETAILED DESCRIPTION

The illustrative embodiments recognize and take into account one or more different considerations. For example, the illustrative embodiments recognize and take into account that it may be desirable to reduce the speed at which a door to an aircraft opens or closes. The illustrative embodiments recognize and take into account that reducing the speed at which a door closes may reduce the risk of injury to an operator. Further, reducing the speed at which the door opens may extend the life of the door and the movement system associated with the door, as well as reduce the risk of injury to the operator.

The illustrative embodiments also recognize and take into account that space within the aircraft may be limited. As a result, it may be desirable to have a dampening system for the door that takes up the least amount of space possible while still providing a desired level of reduction in speed of the door.

The illustrative embodiments further recognize and take into account that it may be desirable to provide for an increase or decrease in the volume of fluid within the dampening system. For example, the illustrative embodiments recognize and take into account that it may be desirable to compensate for thermal expansion of the fluid, thermal contraction of the fluid, fluid loss, or a combination thereof, without increasing the size of the dampening system more than desired.

Thus, the illustrative embodiments provide a method and apparatus for dampening a structure in an aircraft. An apparatus comprises a housing, a first compartment, a second compartment, a first piston, a rod, and a second piston. The housing has an elongate shape. The first compartment is located along an axis extending centrally through the housing. The second compartment is located adjacent to the first compartment on the axis extending centrally through the housing. The first piston is located within the first compartment of the housing. The first piston defines a first chamber and a second chamber of the first compartment as the first piston moves within the housing. A rod is associated with the first piston and extends centrally through the first compartment and the second compartment. The second piston is coaxial to the first piston and located within the second compartment of the housing. The second piston moves relative to the rod to accommodate entrance and exit of fluid from the second compartment.

Figure 1:
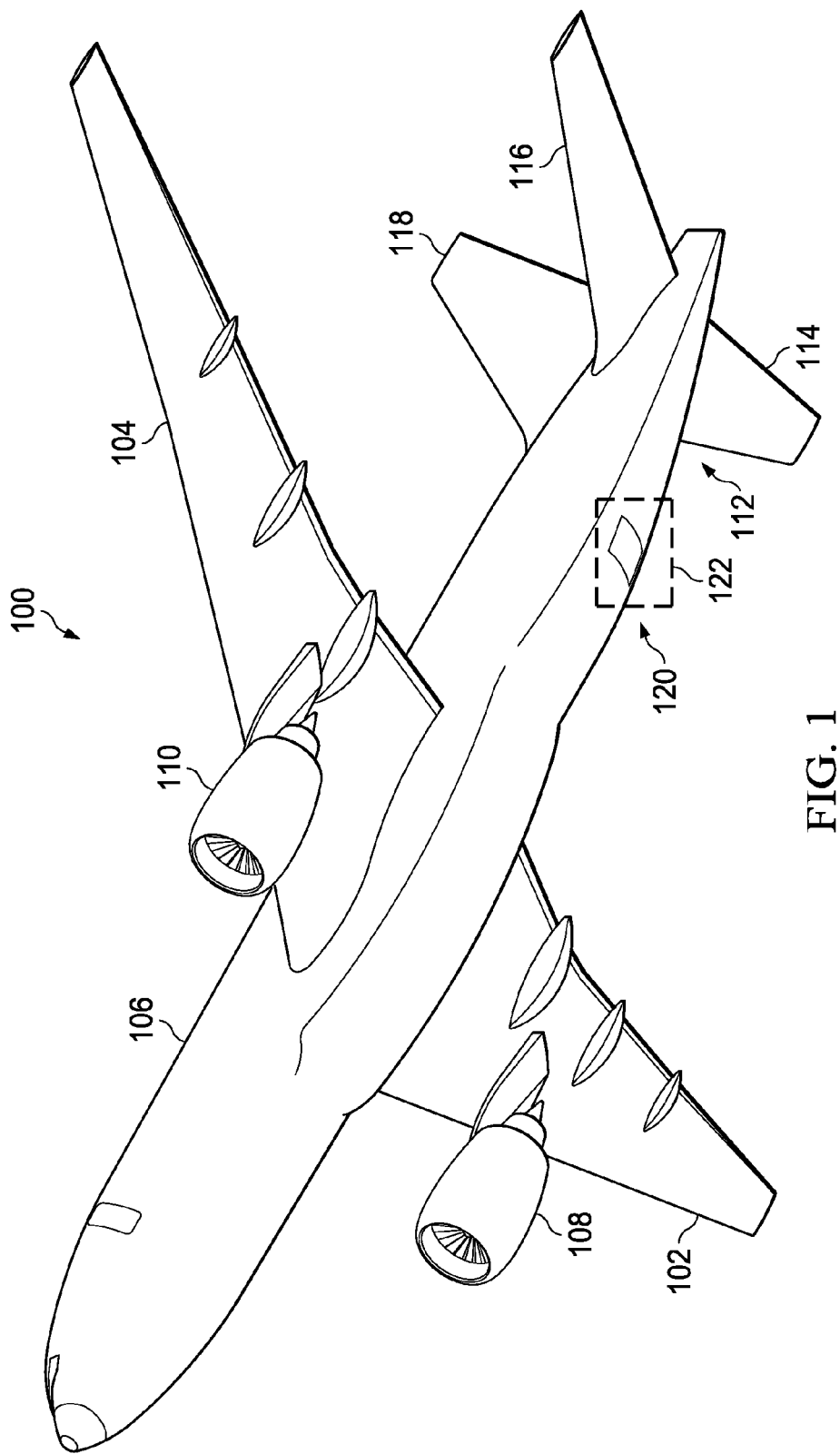
FIG. 1 is an illustration of an aircraft in accordance with an illustrative embodiment.

Referring now to the figures and, in particular, with reference to FIG. 1, an illustration of an aircraft is depicted in accordance with an illustrative embodiment. In this depicted example, a bottom view of aircraft 100 is shown.

As depicted, aircraft 100 has wing 102 and wing 104 attached to body 106. Aircraft 100 includes engine 108 attached to wing 102 and engine 110 attached to wing 104.

In this illustrative example, body 106 has tail section 112. Horizontal stabilizer 114, horizontal stabilizer 116, and vertical stabilizer 118 are attached to tail section 112 of body 106.

Aircraft 100 is an example of an aircraft in which a dampening system for a door may be implemented in accordance with an illustrative embodiment. In this illustrative example, "dampening" refers to the reduction in speed at which a structure moves between two positions. A dampening system also may be referred to as a "snubber," a "dashpot," or other types of dampening devices by those skilled in the art.

As illustrated, aircraft 100 has door 120. Door 120 is shown in section 122 of aircraft 100.

In this illustrative example, door 120 opens and closes to expose the interior of aircraft 100. Door 120 is associated with a dampening system and a hinge system (both not shown in this view). The dampening system and the hinge system control the movement of door 120 as door 120 moves between a closed position and an open position.

Figure 2:
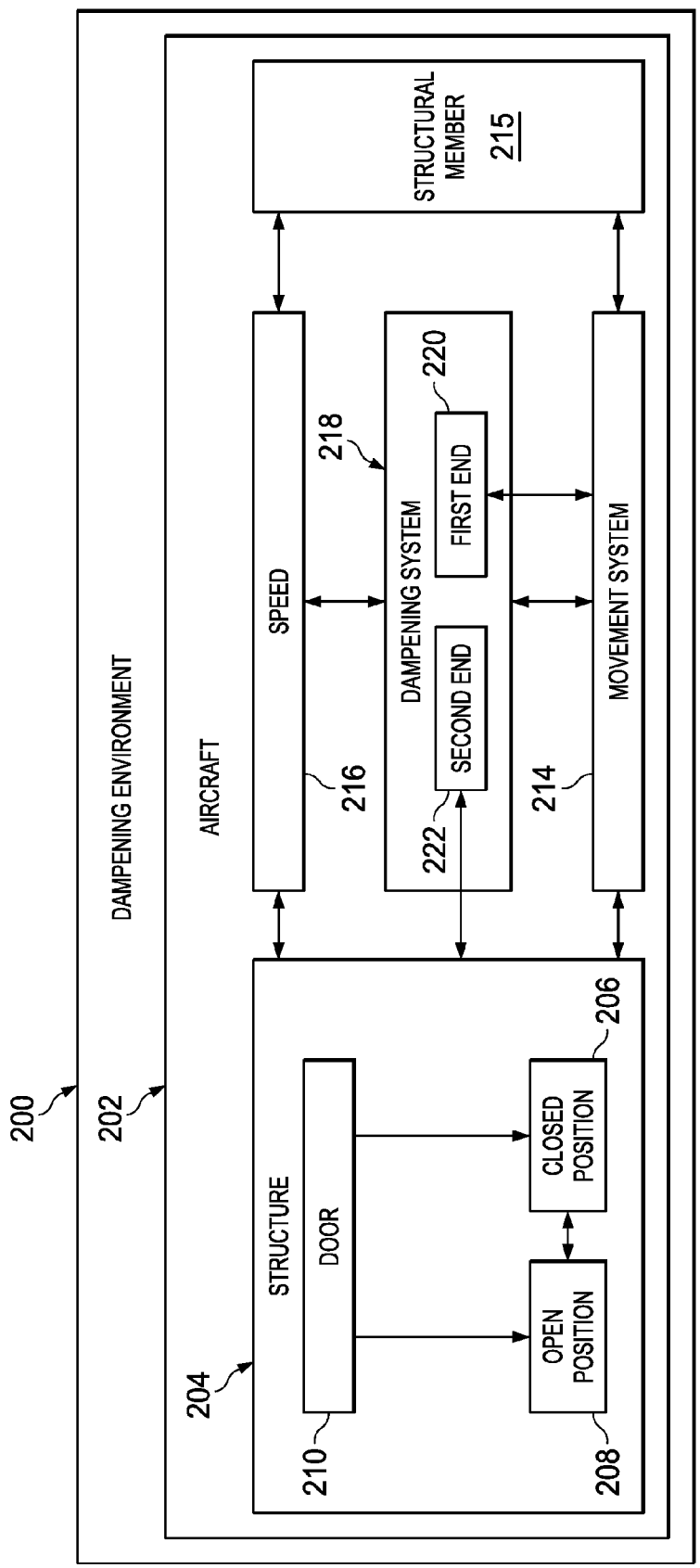
FIG. 2 is an illustration of a block diagram of a dampening environment in accordance with an illustrative embodiment.

With reference next to FIG. 2, an illustration of a block diagram of a dampening environment is depicted in accordance with an illustrative embodiment. Dampening environment 200 is a location in which a mechanical device may be used to control the speed of a structure connected to aircraft 202. Aircraft 100 in FIG. 1 is an example of an implementation for aircraft 202 shown in block form in this figure.

As illustrated, aircraft 202 includes structure 204. Structure 204 is an object within aircraft 202 that moves between closed position 206 and open position 208.

Structure 204 may take a number of different forms. In this illustrative example, structure 204 is selected from one of a door, a hatch, a gate, a flap, and other suitable structures.

In this depicted example, structure 204 takes the form of door 210. Door 210 is a moveable barrier for aircraft 202. Door 210 may take the form of an access door, a cargo door, and other suitable types of doors.

As illustrated, closed position 206 is a configuration for structure 204 in which structure 204 covers an opening in aircraft 202. For instance, when door 210 is in closed position 206, the interior of aircraft 202 is not exposed.

In this illustrative example, open position 208 is a configuration for structure 204 in which structure 204 has been moved to expose an opening in aircraft 202. For example, door 210 may move to open position 208 to expose a bay in aircraft 202. In this illustrative example, a bay is a compartment within aircraft 202. At least one of refueling equipment, cargo, electronic equipment, or other suitable types of objects may be accessed when door 210 is in open position 208.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As depicted, movement system 214 is associated with structure 204. As used herein, when one component is "associated" with another component, the association is a physical association in the depicted examples. For example, a first component, such as movement system 214, may be considered to be associated with a second component, such as structure 204, by being secured to the second component, bonded to the second component, mounted to the second component, welded to the second component, fastened to the second component, connected to the second component in some other suitable manner, or a combination thereof. The first component also may be connected to the second component using a third component. Further, the first component may be considered to be associated with the second component by being formed as part of the second component, as an extension of the second component, or a combination thereof.

As illustrated, structure 204 is connected to movement system 214. Movement system 214 is also connected to structural member 215 of aircraft 202 by movement system 214.

In this illustrative example, structural member 215 is an object that is part of the airframe of aircraft 202. Structural member 215 may be selected from one of a stringer, a frame, a rib, a spar, and other suitable types of structural members in aircraft 202. In this example, movement system 214 attaches structure 204 to aircraft 202.

Movement system 214 is a mechanical device that constrains movement of structure 204 between closed position 206 and open position 208. In this depicted example, movement system 214 comprises a number of components used to constrain movement of structure 204. As used herein, a "number of" items may be one or more items. In this illustrative example, a number of components means one or more components.

For example, movement system 214 may include a hinge arm to provide a desired angle of movement for structure 204. Movement system 214 also may comprise a number of pins, bearings, fasteners, beams, rods, actuators, linkages, clips, and other suitable types of components used to connect the hinge arm to structure 204 and structural member 215.

As depicted, structure 204 opens with speed 216 between closed position 206 and open position 208. Speed 216 is the rate of change in position of structure 204 relative to fixed structural member 215 as modified by the geometry of the movement system 214. For example, speed 216 is the rate of change of door 210 from closed position 206 to open position 208 relative to structural member 215.

In this illustrative example, speed 216 of structure 204 is dependent on various parameters. These parameters may include the wind conditions surrounding aircraft 202, a weight of structure 204, and other suitable parameters. When speed 216 of structure 204 is greater than desired, structure 204, movement system 214, or both may fail, loosen, cause injury, or otherwise not perform in a desired manner.

In this depicted example, dampening system 218 is used to control speed 216 of structure 204. Specifically, dampening system 218 is a mechanical device configured to slow speed 216 of structure 204 as structure 204 moves between closed position 206 and open position 208.

In an illustrative example, dampening system 218 limits the maximum opening and closing speed 216 of door 210 to about 0.7 radians per second. In other illustrative examples, speed 216 may be reduced to a greater or lesser value, depending on the particular implementation. The desired reduction in speed may be based on safety criteria, internal company standards, government standards, other suitable parameters, or a combination thereof.

As illustrated, dampening system 218 has first end 220 and second end 222. In this illustrative example, first end 220 is attached to movement system 214. Second end 222 is attached to structure 204.

In other illustrative examples, the orientation of dampening system 218 may be reversed. For example, first end 220 may be attached to structure 204. Second end 222 may be attached to movement system 214. In this manner, dampening system 218 can be oriented in either direction.

Figure 3:
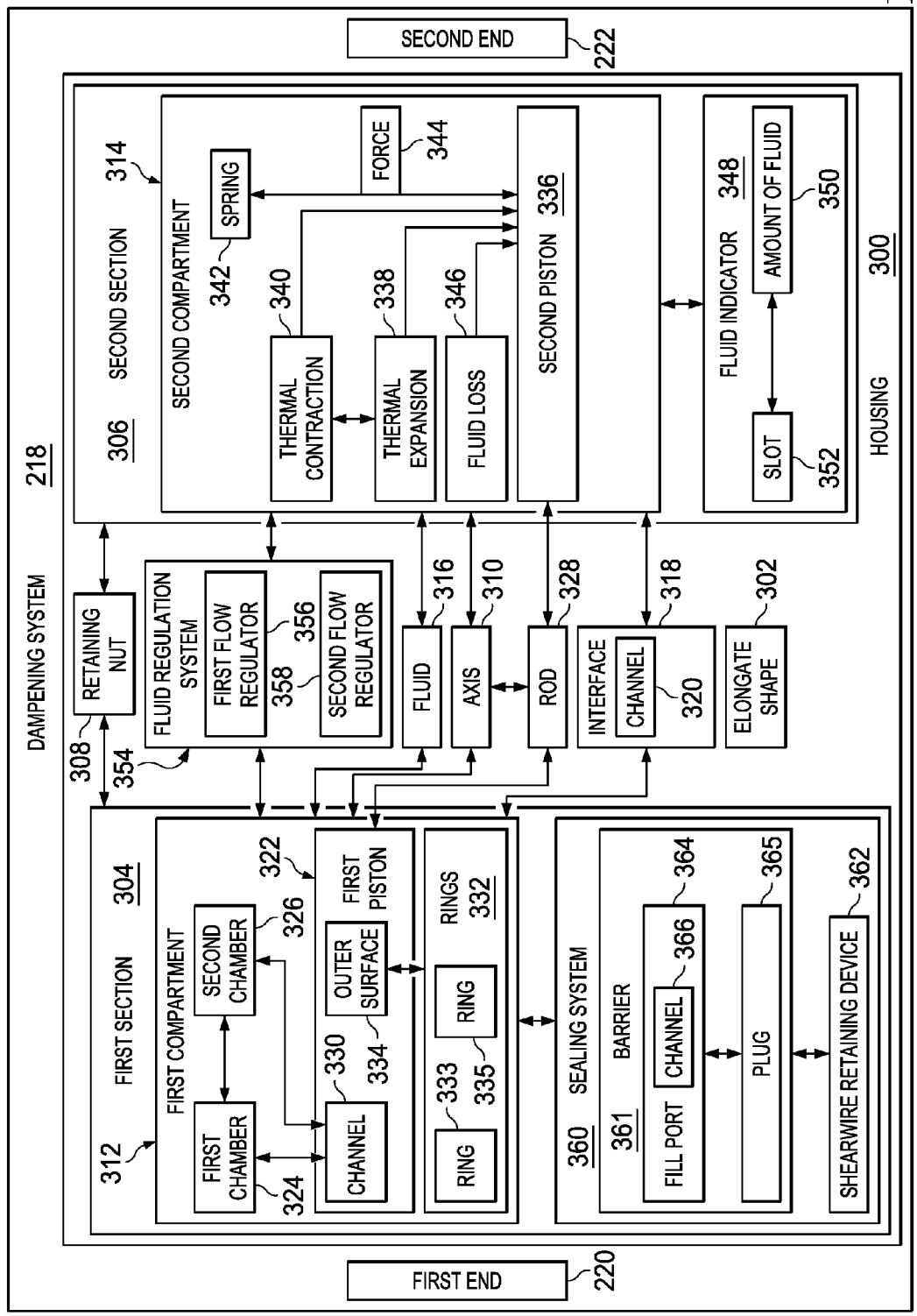
FIG. 3 is an illustration of a block diagram of a dampening system in accordance with an illustrative embodiment.

Turning next to FIG. 3, an illustration of a block diagram of a dampening system is depicted in accordance with an illustrative embodiment. In this depicted example, components within dampening system 218 from FIG. 2 are shown in greater detail.

As depicted, dampening system 218 includes housing 300. Housing 300 forms the structure of dampening system 218. Housing 300 has elongate shape 302.

In this depicted example, elongate shape 302 is a configuration for housing 300 in which the length of housing 300 is greater than its width. In other words, elongate shape 302 is a long and narrow shape.

In an illustrative example, elongate shape 302 may take the form of a cylinder. In other illustrative examples, elongate shape 302 may take the form of a hexagonal prism, a triangular prism, a cuboid, and other suitable shapes.

In this depicted example, housing 300 may be formed from various types of materials. The materials selected for housing 300 are configured to withstand operating conditions of aircraft 202. For example, the materials selected for housing 300 are configured to withstand varying temperatures in the environment around aircraft 202, pressure changes in the environment around aircraft 202, forces exerted on housing 300 by door 210, other suitable parameters, and combinations of parameters. For example, housing 300 may be formed from a material selected from at least one of a metal, a metal alloy, plastic, or other suitable materials.

In this depicted example, housing 300 comprises first section 304 and second section 306. First section 304 is attached to second section 306 using retaining nut 308. Retaining nut 308 is a mechanical device configured to hold first section 304 in place relative to second section 306 during use of dampening system 218. In other words, retaining nut 308 immovably connects first section 304 of housing 300 to second section 306 of housing 300 while dampening system 218 is installed in aircraft 202 in FIG. 2.

As illustrated, axis 310 extends centrally through housing 300 from first end 220 to second end 222. Components within housing 300 are arranged along axis 310 extending through the center of housing 300.

In this depicted example, housing 300 has first compartment 312 and second compartment 314. First compartment 312 is located along axis 310. Second compartment 314 is located adjacent to first compartment 312 on axis 310.

In this illustrative example, when one component is "adjacent" to another component, the first component is contiguous with the second component such that the two components share a common side. In this illustrative example, first compartment 312 and second compartment 314 are adjacent to one another between first end 220 and second end 222 of dampening system 218. In other words, first compartment 312 and second compartment 314 are not parallel. Instead, these compartments are arranged along axis 310 in a side by side manner. Axis 310 extends centrally through first compartment 312 and second compartment 314.

In this illustrative example, first compartment 312 is a space located in first section 304 of housing 300. Second compartment 314 is a space located in second section 306 of housing 300. A portion of second compartment 314 also may be surrounded by a portion of first section 304 of housing 300.

As depicted, first compartment 312 and at least a portion of second compartment 314 are filled with fluid 316. Fluid 316 is a medium that flows within housing 300.

Fluid 316 may take a number of different forms in this illustrative example. For example, fluid 316 may be selected from one of a hydraulic fluid, air, water, oil, and other suitable types of fluid.

In this illustrative example, interface 318 is present in housing 300 between first compartment 312 and second compartment 314. Interface 318 is a structural barrier between first compartment 312 and second compartment 314.

In this depicted example, interface 318 has channel 320. Channel 320 is a hollow portion of interface 318 that allows fluid 316 to flow between first compartment 312 and second compartment 314.

As depicted, first piston 322 is located within first compartment 312 in housing 300. First piston 322 is a moving component contained by first compartment 312. First piston 322 moves back and forth along axis 310 within first compartment 312 as structure 204 moves between closed position 206 and open position 208 in FIG. 2.

In this illustrative example, first piston 322 defines first chamber 324 and second chamber 326 of first compartment 312 as first piston 322 moves within housing 300. First chamber 324 is a space within first compartment 312 between first end 220 of housing 300 and first piston 322.

In this depicted example, second chamber 326 is a space within first compartment 312 between first piston 322 and interface 318. Second compartment 314 is in communication with second chamber 326 of first compartment 312 through channel 320. In this manner, fluid 316 flows between second chamber 326 to second compartment 314 through channel 320.

In this illustrative example, the size of first chamber 324 and second chamber 326 changes as first piston 322 moves back and forth along axis 310 in first compartment 312. Specifically, the size of first chamber 324 decreases and the size of second chamber 326 increases as first piston 322 moves away from interface 318. This action occurs when structure 204 moves toward open position 208.

In a similar fashion, the size of second chamber 326 decreases and the size of first chamber 324 increases as first piston 322 moves toward interface 318 within housing 300. This action occurs when structure 204 moves toward closed position 206.

As depicted, first piston 322 is connected to rod 328. Rod 328 is an elongate member extending centrally through first compartment 312 and second compartment 314 of housing 300. Rod 328 also shares axis 310. Rod 328 extends and retracts from housing 300 along axis 310 as door 210 opens and closes.

In this example, first piston 322 and rod 328, collectively, may be referred to as a "piston rod." First piston 322 and rod 328 move synchronously.

In this depicted example, rod 328 includes a material configured to withstand forces operating on rod 328. For example, rod 328 comprises a material that can withstand forces exerted on rod 328 when door 210 moves between closed position 206 and open position 208. These forces may be exerted by wind and the weight of door 210, among others. Rod 328 is connected to structure 204 and structural member 215 in FIG. 2 in this illustrative example.

As depicted, first piston 322 has channel 330. Channel 330 is a hollow portion of first piston 322 that allows fluid 316 to flow between first chamber 324 and second chamber 326 in first compartment 312. Fluid 316 flows from first chamber 324 to second chamber 326 though channel 330 as first piston 322 moves away from interface 318.

As illustrated, rings 332 are associated with first piston 322. Specifically, rings 332 are associated with outer surface 334 of first piston 322. Outer surface 334 interfaces with an inner surface of housing 300. Rings 332 are mechanical devices in this illustrative example. Rings 332 may perform various functions such as sealing structures, preventing leaks, preventing contaminants from entering dampening system 218, and other functions.

Rings 332 may include ring 333 and ring 335 that extend around the circumference of first piston 322 in this illustrative example. In other examples, additional rings may be present. These additional rings may be o-rings, scraper rings, backup rings, or other suitable types of rings.

In this illustrative example, ring 333 is configured to substantially prevent excess flow of fluid 316 between outer surface 334 of first piston 322 and housing 300. Ring 333 also may prevent contaminants from entering dampening system 600. In this manner, ring 333 provides a seal between first piston 322 and housing 300.

In this depicted example, ring 335 is a "split ring." In other words, ring 335 comprises a gap between its ends such that ring 335 is not continuous. Ring 335 is configured to center first piston 322 in housing 300 as first piston 322 moves within first compartment 312. Ring 335 is configured to prevent contact between the first piston 322 and housing 300.

As depicted, dampening system 218 includes second piston 336 coaxial to first piston 322. As used herein, a first object, such as second piston 336, is "coaxial" to a second object, such as first piston 322, when the two objects share a common axis. In the case, first piston 322 and second piston 336 share axis 310.

In this illustrative example, second piston 336 is located within second compartment 314 of housing 300. Second piston 336 is a moving component contained by second compartment 314. Second piston 336 moves toward second end 222 of housing 300 in response to fluid 316 flowing through channel 320 in interface 318 from second chamber 326 of first compartment 312 to second compartment 314.

As depicted, second piston 336 moves relative to rod 328 to accommodate movement of fluid 316 between first compartment 312 and second compartment 314. For example, second piston 336 moves to accommodate flow of fluid 316 during operation of dampening system 218. Second piston 336 also moves to accommodate thermal expansion 338 and thermal contraction 340 of fluid 316.

In this illustrative example, thermal expansion 338 is an increase in volume of fluid 316 in response to an increase in temperature of fluid 316. Thermal contraction 340 is the decrease in volume of fluid 316 in response to a decrease in temperature.

In this depicted example, fluid 316 may experience thermal expansion 338 and thermal contraction 340 during operation of aircraft 202. For instance, as the temperature in the environment around aircraft 202 increases, fluid 316 may experience thermal expansion 338. As the temperature in the environment around aircraft 202 decreases, fluid 316 may experience thermal contraction 340. Fluid 316 flows into and out of second compartment 314 based on its volume.

In this depicted example, fluid 316 flows from second chamber 326 to second compartment 314 under various conditions. For example, some of fluid 316 flows from second chamber 326 as rod 228 extends and retracts from housing 300. Fluid 316 also flows from second chamber 326 to second compartment 314 as fluid 316 expands. Second piston 336 moves toward second end 222 of housing 300 as fluid 316 flows into second compartment 314.

Spring 342 is associated with second piston 336 in this illustrative example. Spring 342 is a mechanical device that stores energy. Spring 342 may be selected from one of a coil spring, a flat spring, a compression spring, a cantilever spring, and other suitable types of springs or configurations of springs. In this illustrative example, spring 342 is compressed by second piston 336 in response to flow of fluid 316 into second compartment 314.

In this depicted example, fluid 316 flows from second compartment 314 to second chamber 326 under various conditions. For example, fluid 316 flows back into second chamber 326 as dampening system 218 reaches its resting position. Fluid 316 also flows from second compartment 314 to second chamber 326 as fluid 316 contracts.

Spring 342 applies force 344 against second piston 336 to drive fluid 316 into second chamber 326. Force 344 is a force sufficient to move fluid 316 into second chamber 326 through channel 320 in interface 318 in this illustrative example. In this manner, second piston 336 and spring 342 help replenish fluid 316 in first compartment 312. Additionally, second compartment 314 serves as a thermal compensation reservoir for dampening system 218.

As depicted, second compartment 314 also compensates for fluid loss 346 of dampening system 218. Fluid loss 346 may represent "normal fluid loss" of dampening system 218. In this case, normal fluid loss is an amount of fluid 316 that leaks from dampening system 218 during the operation of dampening system 218.

Fluid loss 346 from second compartment 314 may occur at one or more seals. As another example, fluid loss 346 may occur from first chamber 324 in first compartment 312 at one or more seals.

When fluid loss 346 occurs from second compartment 314, the fluid may be expelled from housing 300 through holes in second section 306 of housing 300. In other words, the fluid may be drained from housing 300 such that the fluid does not freeze and clamp up second piston 336 in an undesired manner. In addition, the holes in second section 306 of housing 300 also may allow drainage of other fluids, such as rain water or condensation, from housing 300 during operation of dampening system 218.

In this depicted example, as fluid loss 346 occurs, additional fluid 316 may be needed in first compartment 312 for dampening system 218 to function as desired. Accordingly, fluid 316 currently present in second compartment 314 is moved into first compartment 312. Specifically, spring 342 exerts force 344 on second piston 336 to move fluid 316 into first compartment 312 to compensate for fluid loss 346. In this manner, dampening system 218 may continue to operate as desired without the need for rework.

In this illustrative example, fluid indicator 348 is located in second section 306 of housing 300. Fluid indicator 348 is a component of dampening system 218 that allows an operator to determine amount of fluid 350 present in dampening system 218. Amount of fluid 350 is a volume of fluid 316 in this illustrative example. A low volume of fluid 316 in dampening system 218 may indicate a need to refill dampening system 218 with additional fluid 316.

Fluid indicator 348 may take various forms. For instance, fluid indicator 348 may take the form of a notch, an opening, a line, an electronic device, a sensor, and other suitable types of indicators.

In this illustrative example, fluid indicator 348 comprises slot 352 in second section 306 of housing 300. Slot 352 exposes a portion of second piston 336 to indicate amount of fluid 350 in dampening system 218. The position of second piston 336 in second compartment 314 relative to slot 352 allows an operator to determine amount of fluid 350 in dampening system 218.

As depicted, the rate at which fluid 316 flows through dampening system 218 is controlled by fluid regulation system 354. Fluid regulation system 354 comprises first flow regulator 356 and second flow regulator 358.

In this depicted example, first flow regulator 356 and second flow regulator 358 are mechanical devices configured to allow fluid 316 to flow in a desired manner. First flow regulator 356 is a bi-directional restrictor, while second flow regulator 358 is a restrictor-check valve in this illustrative example.

As depicted, first flow regulator 356 is located in channel 330 in first piston 322 between first chamber 324 and second chamber 326. Second flow regulator 358 is located in channel 320 in interface 318 between second chamber 326 and second compartment 314.

In this depicted example, first flow regulator 356 is configured to restrict the flow of fluid 316 between first chamber 324 and second chamber 326 in both directions. In this manner, first flow regulator 356 slows the flow of fluid 316 in both directions and therefore, slows the speed at which first piston 322 moves through first compartment 312.

Second flow regulator 358 restricts the flow of fluid 316 from second chamber 326 into second compartment 314. Second flow regulator 358 allows free flow of fluid 316 from second compartment 314 into second chamber 326.

In this depicted example, sealing system 360 is located at the end of housing 300. Sealing system 360 includes a number of devices configured to seal housing 300 to substantially prevent fluid 316 from leaving first compartment 312 of housing 300.

Sealing system 360 includes barrier 361 and shearwire retaining device 362 in this illustrative example. Sealing system 360 may be referred to as a "rod end seal gland" or a "rod end bulkhead" in some illustrative examples.

As depicted, barrier 361 is a partition located between first compartment 312 and the exterior of housing 300. Shearwire retaining device 362 is a component that retains barrier 361 in housing 300. Shearwire retaining device 362 may include a metal wire arranged in a notch within housing 300 and barrier 361.

In this example, the wire may be referred to as a "shearwire." When installing shearwire retaining device 362, first section 304 of housing 300 is rotated such that the wire wraps around barrier 361 and is trapped between barrier 361 and first section 304 of housing 300.

In this depicted example, fill port 364 is located within barrier 361 of sealing system 360. Fill port 364 is an opening in sealing system 360. Fill port 364 is configured to allow fluid 316 to be placed in first compartment 312.

Plug 365 is installed in the fill port 364 in this depicted example. Plug 365 is a removable plug configured to seal fill port 364. Plug 365 is removed prior to filling dampening system 218 with fluid 316. After plug 365 is removed, a fluid line (not shown) is connected to fill port 364 to supply fluid 316 to dampening system 218.

In this illustrative example, fill port 364 is associated with channel 366. Channel 366 is a hollow portion of barrier 361 between fill port 364 and first compartment 312. In this depicted example, channel 366 is in communication with first compartment 312. Fluid 316 flows through fill port 364 and channel 366 from outside of dampening system 218 into first compartment 312.

The illustration of dampening system 218 and the components within dampening system 218 in FIGS. 2-3 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

As an example, sealing system 360 may seal housing 300 in a different manner than using shearwire retaining device 362. For instance, a threaded arrangement may be used to secure barrier 361 to housing 300.

In another illustrative example, more than one channel may be located in first piston 322, interface 318, or both. Each of these additional channels may be configured to regulate the flow of fluid 316 through the channels. One or more flow regulators may be positioned within each channel and provide additional restriction of the flow of fluid 316 as desired.

In still another illustrative example, rod 328 may have varying diameters. For example, the diameter of rod 328 may be different between first compartment 312 and second compartment 314. These differences may result in different fluid flow rates within the compartments.

Additionally, structure 204 may take other forms other than an access door. For instance, structure 204 may take the form of a bulk cargo door. In other illustrative examples, structure 204 may be a canopy in a military aircraft.

Although the illustrative examples are described with respect to aircraft 202, an illustrative embodiment may be applied to other types of platforms. The platform may be, for example, a mobile platform, a stationary platform, a land-based structure, an aquatic-based structure, and a space-based structure. More specifically, the platform may be a surface ship, a rotorcraft, a helicopter, a hot-air balloon, a tank, a personnel carrier, a train, a spacecraft, a space station, a satellite, a submarine, an automobile, a power plant, a manufacturing facility, a building, and other suitable platforms.

Figure 4:
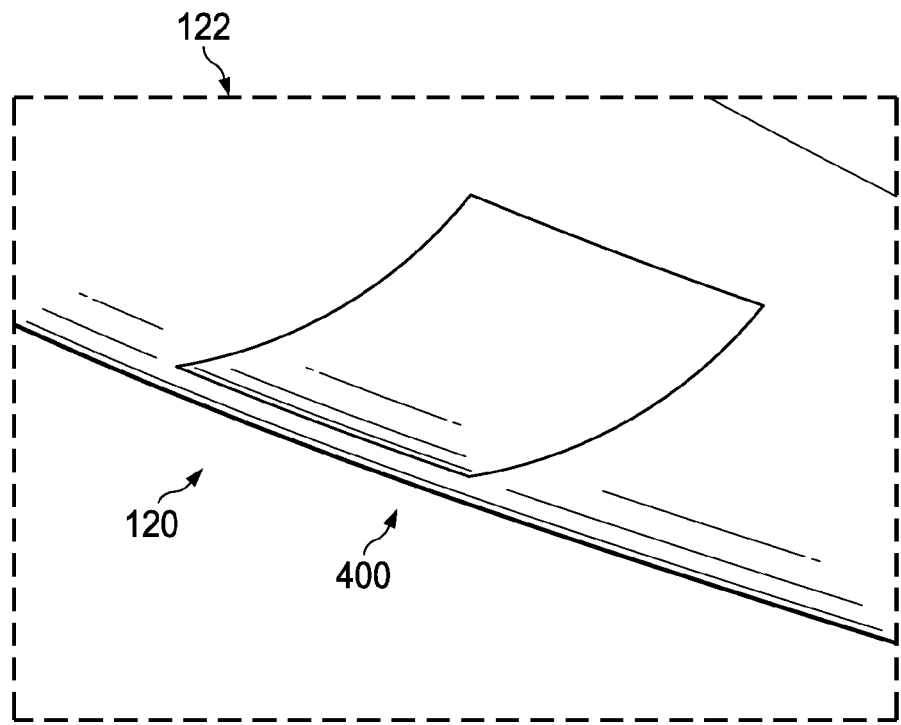
FIG. 4 is an illustration of a section of an aircraft in accordance with an illustrative embodiment.

With reference now to FIG. 4, an illustration of a section of an aircraft is depicted in accordance with an illustrative embodiment. In this depicted example, section 122 of aircraft 100 with door 120 from FIG. 1 is shown. Door 120 is in closed position 400 in this illustrative example.

Figure 5:
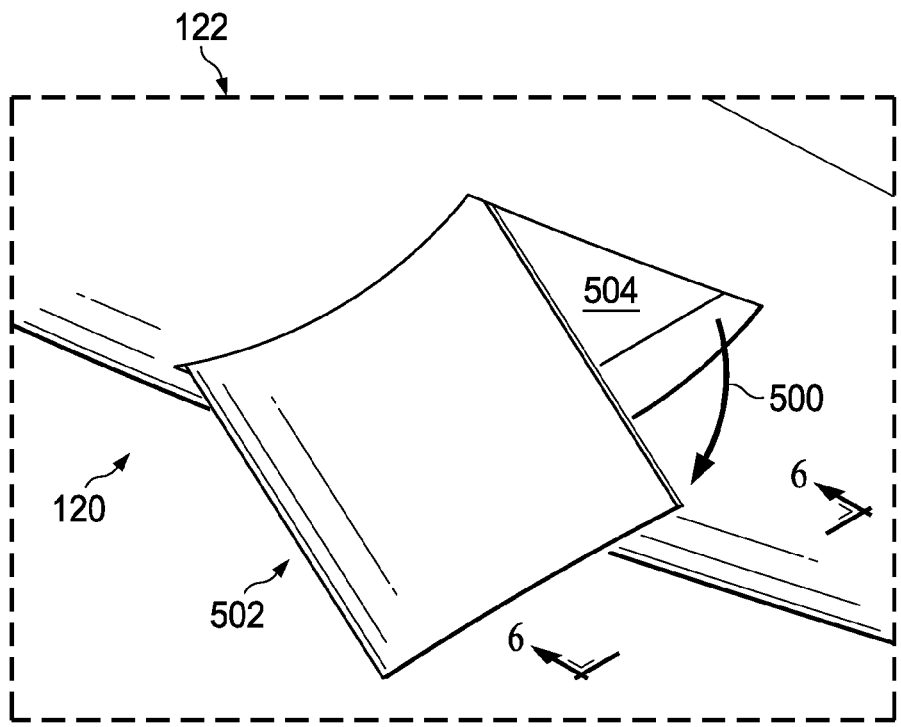
FIG. 5 is an illustration of a door of an aircraft in an open position in accordance with an illustrative embodiment.

Turning next to FIG. 5, an illustration of a door of an aircraft in an open position is depicted in accordance with an illustrative embodiment. In this depicted example, door 120 has moved in the direction of arrow 500 to open position 502. Interior 504 of aircraft 100 from FIG. 1 is now exposed. Interior 504 may be a bay of aircraft 100 in this illustrative example.

Figure 6:
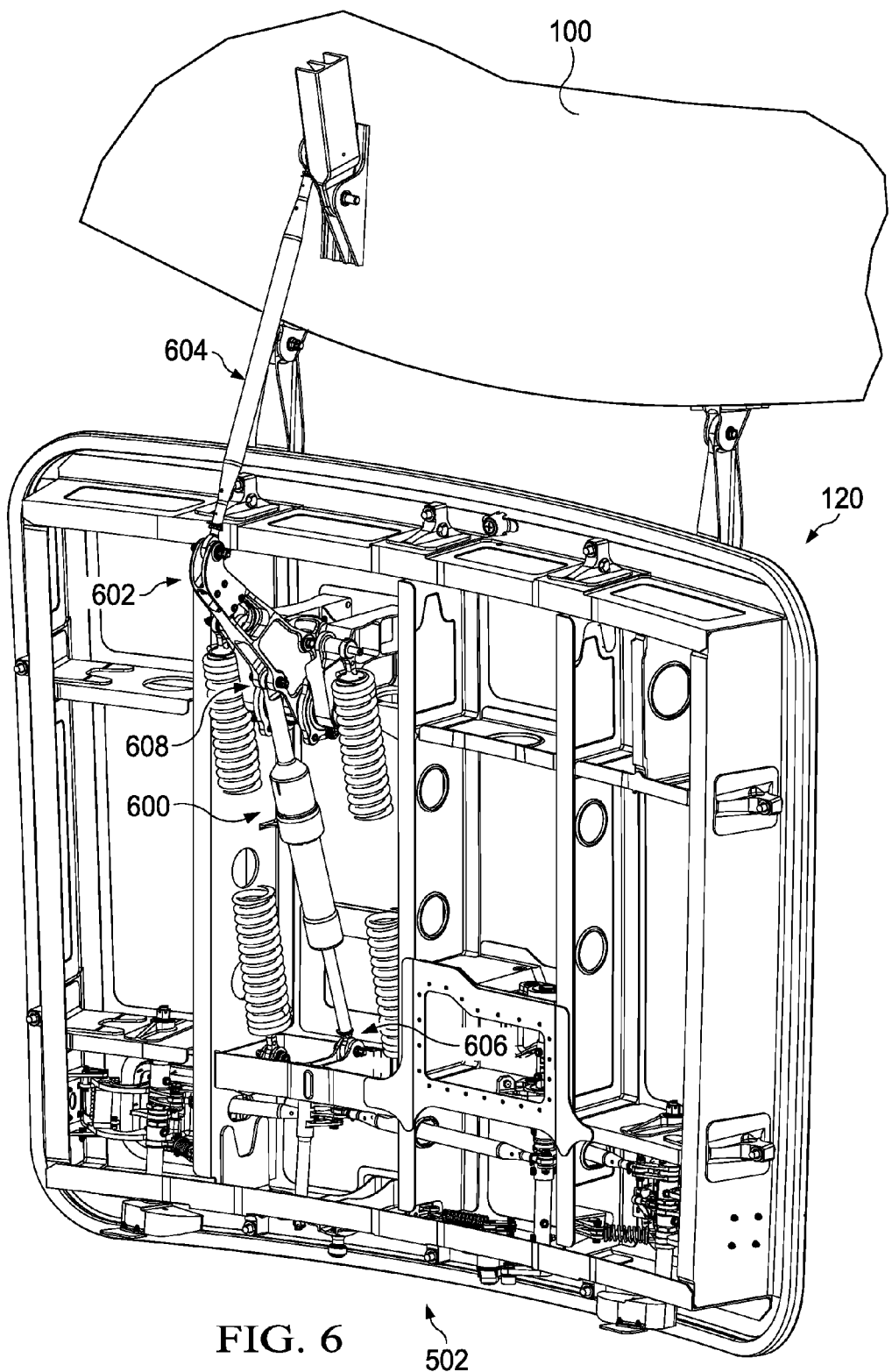
FIG. 6 is an illustration of a door of an aircraft with a dampening system and a movement system in accordance with an illustrative embodiment.

Referring next to FIG. 6, an illustration of a door of an aircraft with a dampening system and a movement system is depicted in accordance with an illustrative embodiment. In this depicted example, door 120 in open position 502 is shown in the direction of lines 6-6 in FIG. 5.

As illustrated, dampening system 600 and hinge system 602 are associated with door 120. Dampening system 600 and hinge system 602 are examples of implementations for dampening system 218 and movement system 214, respectively, shown in block form in FIG. 2.

Hinge system 602 includes hinge arm 604 in this illustrative example. Hinge arm 604 connects door 120 to aircraft 100.

In this depicted example, dampening system 600 is connected to door 120 and hinge system 602. Specifically, first end 606 of dampening system 600 is connected to door 120 and second end 608 of dampening system 600 is connected to hinge arm 604.

Figure 7:
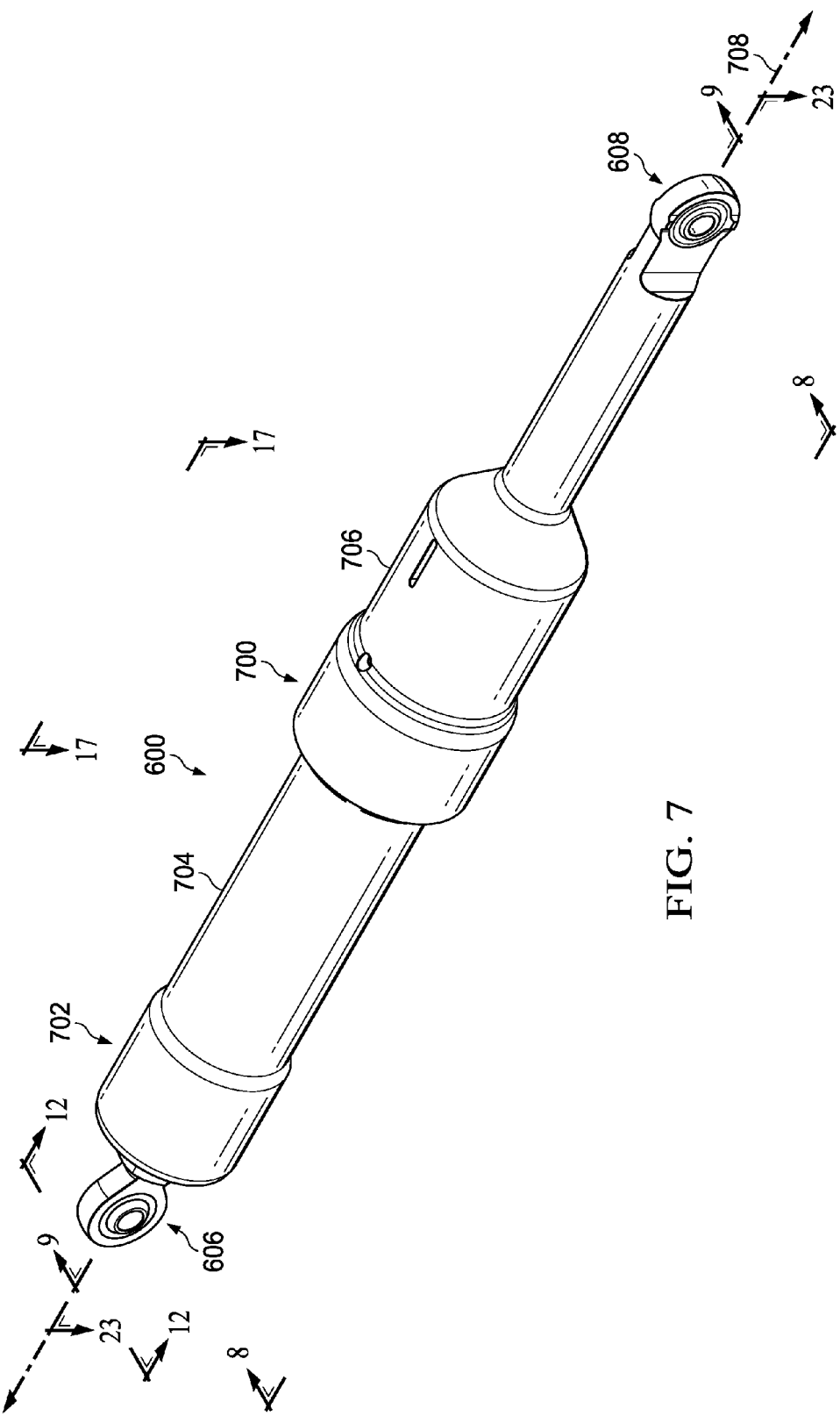
FIG. 7 is an illustration of a perspective view of a dampening system in accordance with an illustrative embodiment.

Turning now to FIG. 7, an illustration of a perspective view of a dampening system is depicted in accordance with an illustrative embodiment. In this depicted example, a perspective view of dampening system 600 from FIG. 6 is shown.

As depicted, dampening system 600 has housing 700. Housing 700 has elongate shape 702. In this illustrative example, housing 700 has first section 704 and second section 706. Housing 700 has axis 708 extending centrally through housing 700 in this illustrative example.

Figure 8:
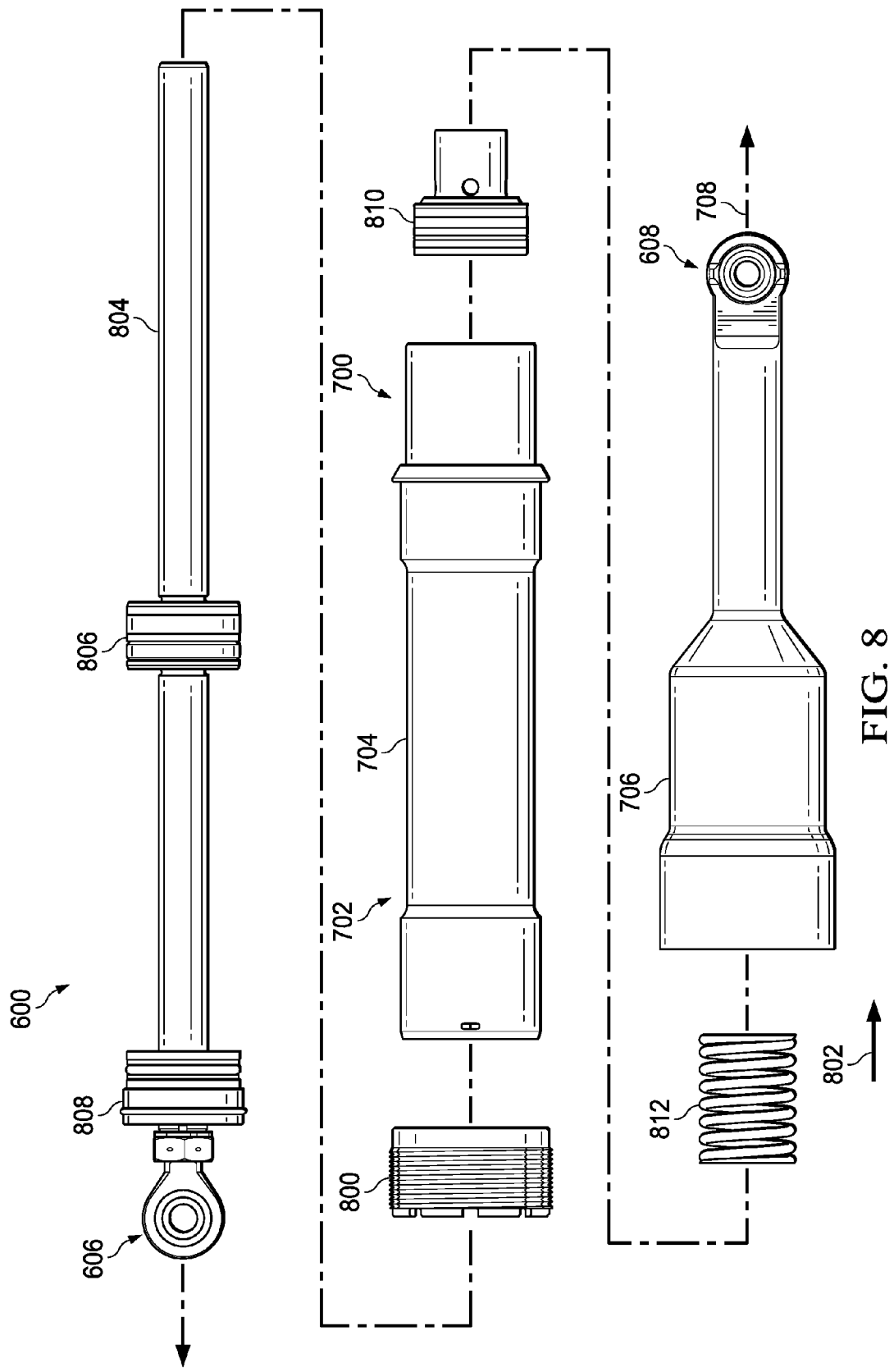
FIG. 8 is an illustration of an exploded view of a dampening system in accordance with an illustrative embodiment.

In FIG. 8, an illustration of an exploded view of a dampening system is depicted in accordance with an illustrative embodiment. In this depicted example, an exploded view of dampening system 600 is shown in the direction of lines 8-8 in FIG. 7.

Retaining nut 800 is configured to join first section 704 and second section 706 of housing 700 when housing 700 is assembled. Retaining nut 800 receives first section 704 and engages with second section 706. Retaining nut 800 is placed on first section 704 of housing 700 in the direction of arrow 802.

Rod 804 with piston 806 is seen in this view. Piston 806 is connected to rod 804 and moves as rod 804 moves. Rod 804 extends centrally through housing 700 along axis 708. Rod 804 is received by first section 704 and second section 706 of housing 700. Rod 804 is placed within housing 700 in the direction of arrow 802. Piston 806 moves within first section 704 of housing 700.

In this illustrative example, sealing system 808 seals first end 606 of housing 700 of dampening system 600. Sealing system 808 is associated with rod 804 in this illustrative example.

When assembled, rod 804 moves through an opening (not shown) in sealing system 808 to extend and retract. In this illustrative example, rod 804 extends as door 120 moves from closed position 400 to open position 502 seen in FIG. 4-5. Rod 804 retracts as door 120 moves from open position 502 to closed position 400.

In this depicted example, piston 810 moves along rod 804. Piston 810 moves within second section 706 of housing 700.

Spring 812 is located within second section 706 of housing 700 in this illustrative example. Spring 812 exerts a force on piston 810.

Figure 9:
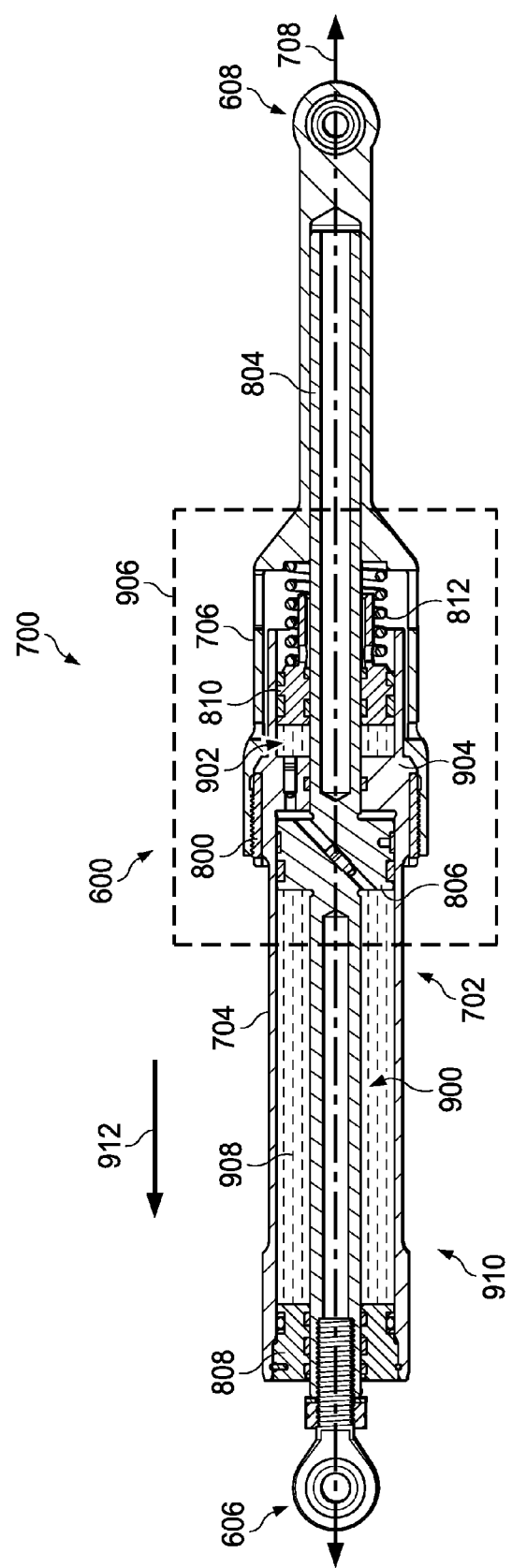
FIG. 9 is an illustration of a cross-sectional view of a dampening system in accordance with an illustrative embodiment.

With reference next to FIG. 9, an illustration of a cross-sectional view of a dampening system is depicted in accordance with an illustrative embodiment. In this depicted example, a cross-sectional view of dampening system 600 taken along lines 9-9 in FIG. 7 is shown.

As depicted, housing 700 has first compartment 900 and second compartment 902. First compartment 900 is located within first section 704 of housing 700. Second compartment 902 is located within second section 706 of housing 700.

In this illustrative example, interface 904 separates first compartment 900 from second compartment 902. Interface 904 may be formed as part of first section 704 of housing 700 or may be a separate component. Interface 904, piston 806, and piston 810 are shown in section 906 of dampening system 600 in this illustrative example.

As illustrated, first compartment 900 and a portion of second compartment 902 hold hydraulic fluid 908. The portion of hydraulic fluid 908 in first compartment 900 is configured to reduce the speed of door 120 as door 120 opens.

In this illustrative example, hydraulic fluid 908 also may flow between first compartment 900 and second compartment 902 due to thermal expansion, thermal contraction, extension and retraction of rod 804, compensation for fluid loss, or a combination thereof.

Dampening system 600 is shown in retracted configuration 910 in this illustrative example. In retracted configuration 910, piston 806 is positioned near interface 904. Piston 806 may not touch interface 904 or sealing system 808 in this illustrative example. Instead, dampening system 600 is configured to stop retracting before piston 806 touches interface 904 or sealing system 808.

Retracted configuration 910 corresponds to closed position 400 of door 120 shown in FIG. 4. As door 120 opens, rod 804 and piston 806 move in the direction of arrow 912.

Figure 10:
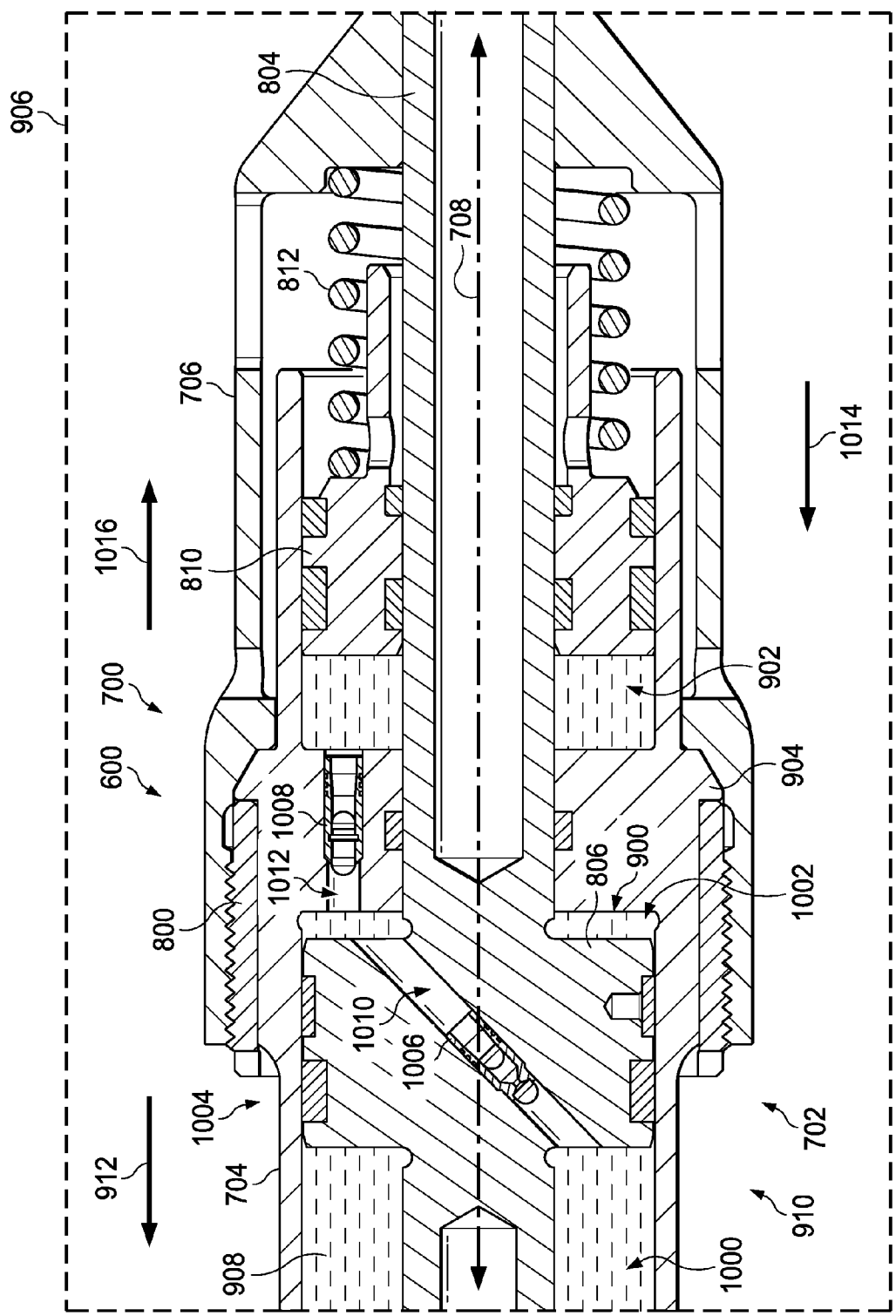
FIG. 10 is an illustration of a section of a dampening system in accordance with an illustrative embodiment.

Turning now to FIG. 10, an illustration of a section of a dampening system is depicted in accordance with an illustrative embodiment. In this depicted example, the components within section 906 of dampening system 600 are shown in greater detail.

First compartment 900 of housing 700 has first chamber 1000 and second chamber 1002 in this illustrative example. Piston 806 defines first chamber 1000 and second chamber 1002.

As illustrated, dampening system 600 includes fluid regulation system 1004. Fluid regulation system 1004 comprises flow regulator 1006 and flow regulator 1008.

In this illustrative example, flow regulator 1006 is located in channel 1010 of piston 806. The flow of hydraulic fluid 908 through channel 1010 in piston 806 is controlled by flow regulator 1006. In this illustrative example, flow regulator 1006 restricts the flow of hydraulic fluid 908 in both directions.

Flow regulator 1008 is located in channel 1012 of interface 904 in this depicted example. The flow of hydraulic fluid 908 through channel 1012 in interface 904 is controlled by flow regulator 1008.

As depicted, flow regulator 1008 allows free flow of hydraulic fluid 908 into second chamber 1002 from second compartment 902 when less fluid is present in second chamber 1002 than desired. This situation may occur due to extension and retraction of rod 804, thermal contraction of hydraulic fluid 908, fluid loss, or a combination thereof.

In this illustrative example, "free flow" is unrestricted flow of hydraulic fluid 908. For example, during retraction, hydraulic fluid 908 in second chamber 1002 is forced into second compartment 902 and also into first chamber 1000, leaving less fluid than required to fill first chamber 1000. As a result, when door 120 is closed and the system is at rest, flow regulator 1008 allows free flow from second compartment 902 into second chamber 1002, then through flow regulator 1006 into first chamber 1000. Piston 810 also moves in the direction of arrow 1014 as fluid flows into second chamber 1002.

In this illustrative example, flow regulator 1008 restricts the flow of hydraulic fluid 908 into second compartment 902. Hydraulic fluid 908 flows into second compartment 902 during extension and retraction of rod 804, when hydraulic fluid 908 experiences thermal expansion, or a combination thereof. Flow of hydraulic fluid 908 into second compartment 902 causes piston 810 to move in the direction of arrow 1016 in this illustrative example.

In this depicted example, spring 812 exerts a force in the direction of arrow 1014 on piston 810 to move hydraulic fluid 908 toward second chamber 1002. When hydraulic fluid 908 is moved into second compartment 902, the movement of piston 810 in the direction of arrow 1016 compresses spring 812.

Figure 11:
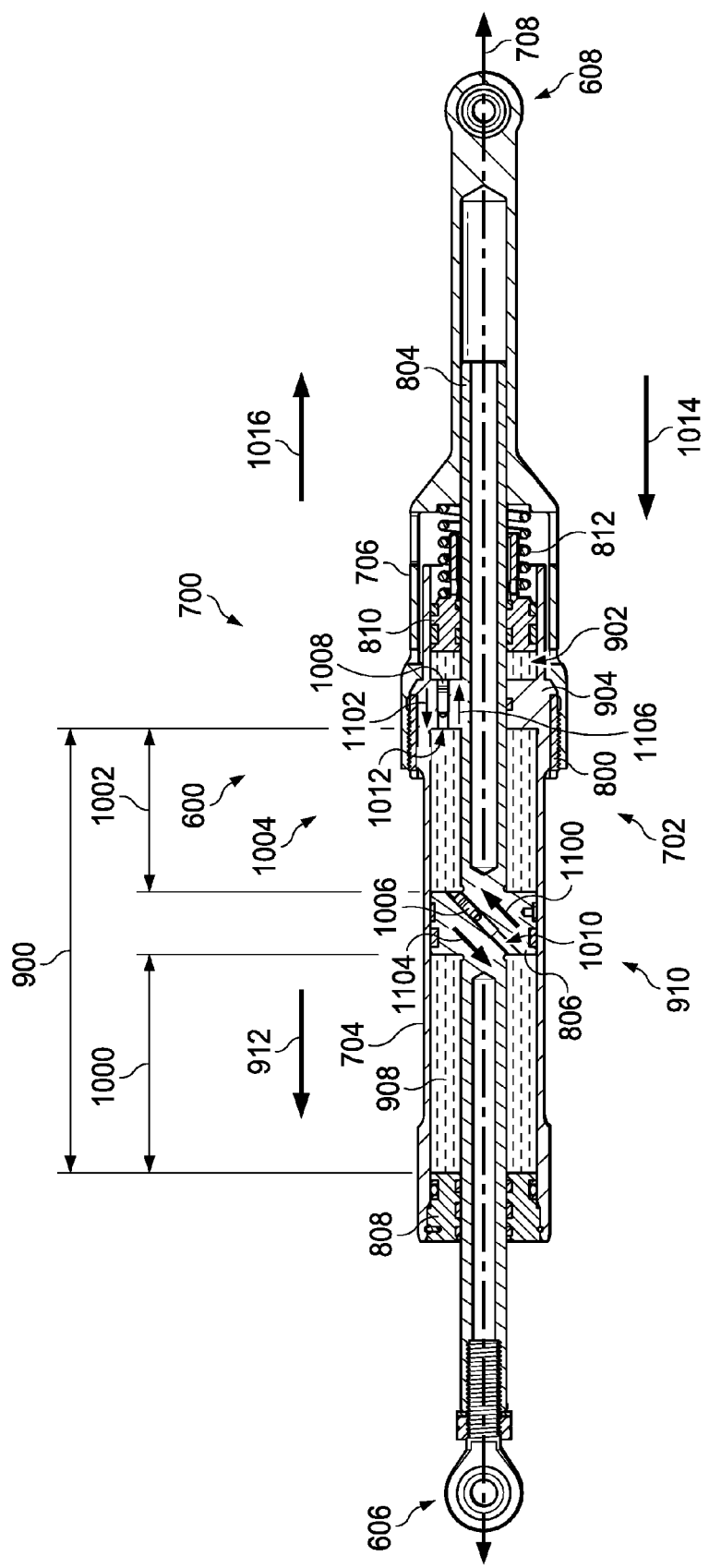
FIG. 11 is an illustration of a cross-sectional view of a dampening system in accordance with an illustrative embodiment.

Referring next to FIG. 11, an illustration of a cross-sectional view of a dampening system is depicted in accordance with an illustrative embodiment. In this depicted example, rod 804 and piston 806 have moved in the direction of arrow 912 as door 120 moves from closed position 400 to open position 502 in FIG. 5.

As rod 804 moves in the direction of arrow 912, piston 806 compresses hydraulic fluid 908 in first chamber 1000. Hydraulic fluid 908 then flows through flow regulator 1006 from first chamber 1000 into second chamber 1002 in the direction of arrow 1100. The flow of hydraulic fluid 908 in the direction of arrow 1100 reduces the speed of door 120. A small volume of hydraulic fluid 908 in second compartment 902 flows through flow regulator 1008 into second chamber 1002 in the direction of arrow 1102.

When piston 806 moves in the opposite direction as door 120 closes (not shown in this view), hydraulic fluid 908 present within second chamber 1002 is compressed. Hydraulic fluid 908 flows in the direction of arrow 1104 through flow regulator 1006 into first chamber 1000. This action slows the speed of door 120 as door 120 closes.

A portion of hydraulic fluid 908 also flows into second compartment 902 in the direction of arrow 1106 in response to this compression. After door 120 has closed and dampening system 600 is at rest, spring 812 forces piston 810 in the direction of arrow 1014 to replenish hydraulic fluid into second chamber 1002.

FIGS. 12-14 are illustrations of various stages of installation of a retaining device depicted in accordance with an illustrative embodiment. In FIGS. 12-14, sealing system 808 on first end 606 of dampening system 600 is shown in the direction of lines 12-12 in FIG. 7.

Sealing system 808 includes retaining device 1200 and barrier 1201 in this illustrative example. Retaining device 1200 is used to seal first section 704 of housing 700 in this illustrative example.

In FIG. 12, retaining device 1200 has been positioned relative to housing 700. Retaining device 1200 includes wire 1202. Wire 1202 is configured to be placed in opening 1204 between barrier 1201 and first section 704 of housing 700. Opening 1204 includes a notch (not shown in this view) in both first section 704 of housing 700 and barrier 1201.

In this illustrative example, wire 1202 is placed in hole 1206 in barrier 1201. Barrier 1201 is then rotated in the direction of arrow 1208 such that wire 1202 is positioned in opening 1204.

Turning next to FIG. 13, wire 1202 has been bent to ease wire 1202 into opening 1204. Barrier 1201 continues to be rotated in the direction of arrow 1208.

In FIG. 14, barrier 1201 has made one complete rotation. Barrier 1201 has been rotated in the direction of arrow 1208 such that wire 1202 fills opening 1204 between barrier 1201 and housing 700. In this manner, retaining device 1200 retains barrier 1201 in housing 700.

Figure 15:
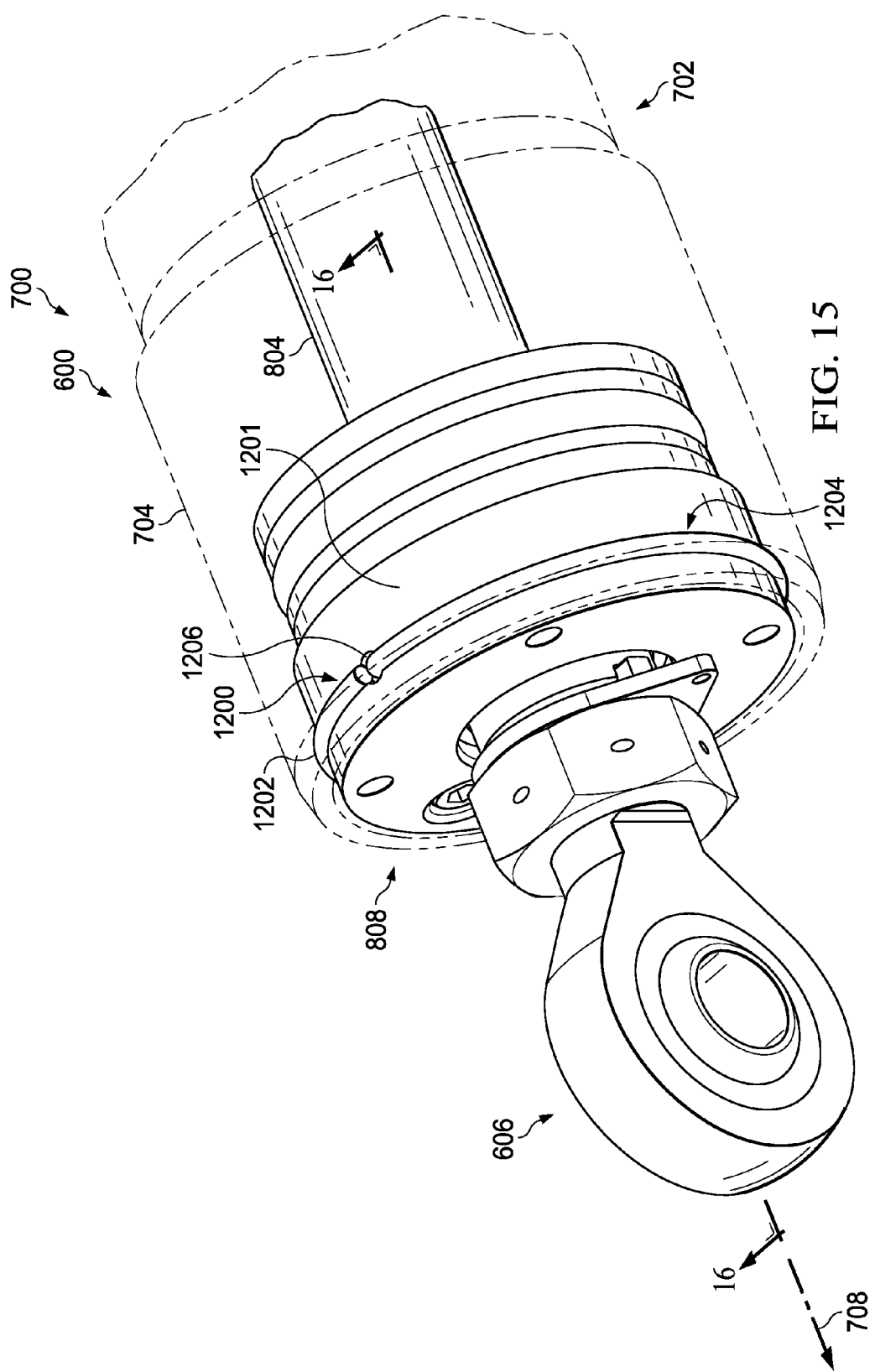
FIG. 15 is a perspective view of a sealing system with a retention device in accordance with an illustrative embodiment.

With reference next to FIG. 15, a perspective view of a sealing system with a retaining device is depicted in accordance with an illustrative embodiment. In this depicted example, a perspective view of sealing system 808 on first end 606 of dampening system 600 is shown.

As depicted, first section 704 of housing 700 is shown in phantom such that retaining device 1200 is visible. In this illustrative example, retaining device 1200 has been placed in opening 1204 to hold barrier 1201 in place. Hole 1206, where wire 1202 was first inserted into barrier 1201, is also visible in this view.

Figure 16:
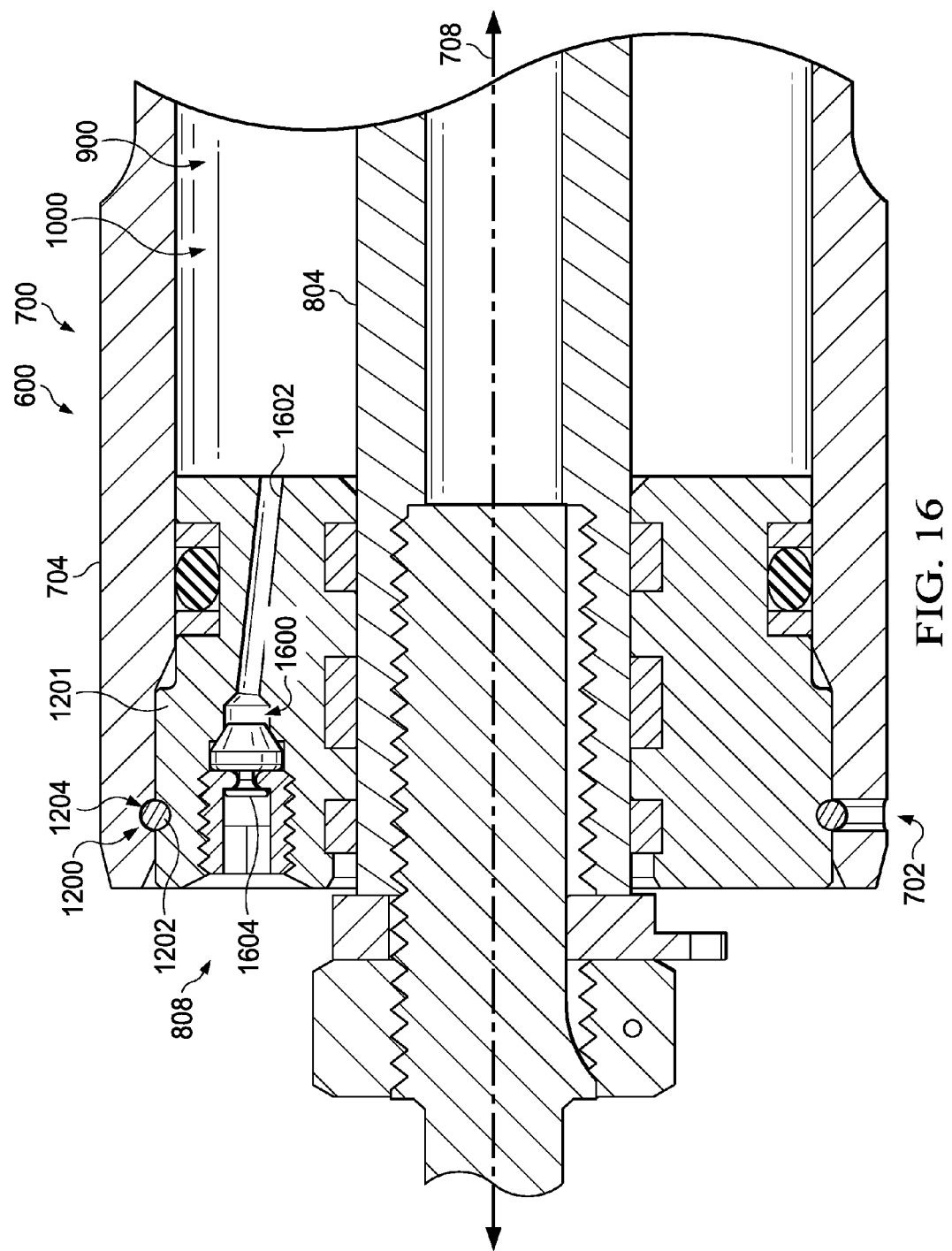
FIG. 16 is an illustration of a cross-sectional view of a sealing system in accordance with an illustrative embodiment.

Turning next to FIG. 16, an illustration of a cross-sectional view of a sealing system is depicted in accordance with an illustrative embodiment. In this depicted example, a cross-sectional view of an end of housing 300 taken along lines 16-16 in FIG. 15 is shown.

As depicted, sealing system 808 includes fill port 1600, channel 1602 located within barrier 1201, and plug 1604. Plug 1604 is positioned in fill port 1600. Plug 1604 prevents fluid from leaving first compartment 900 through fill port 1600.

Dampening system 600 is filled using fill port 1600 after removing plug 1604. Hydraulic fluid flows into dampening system 600 through fill port 1600 and channel 1602 into first compartment 900.

Figure 17:
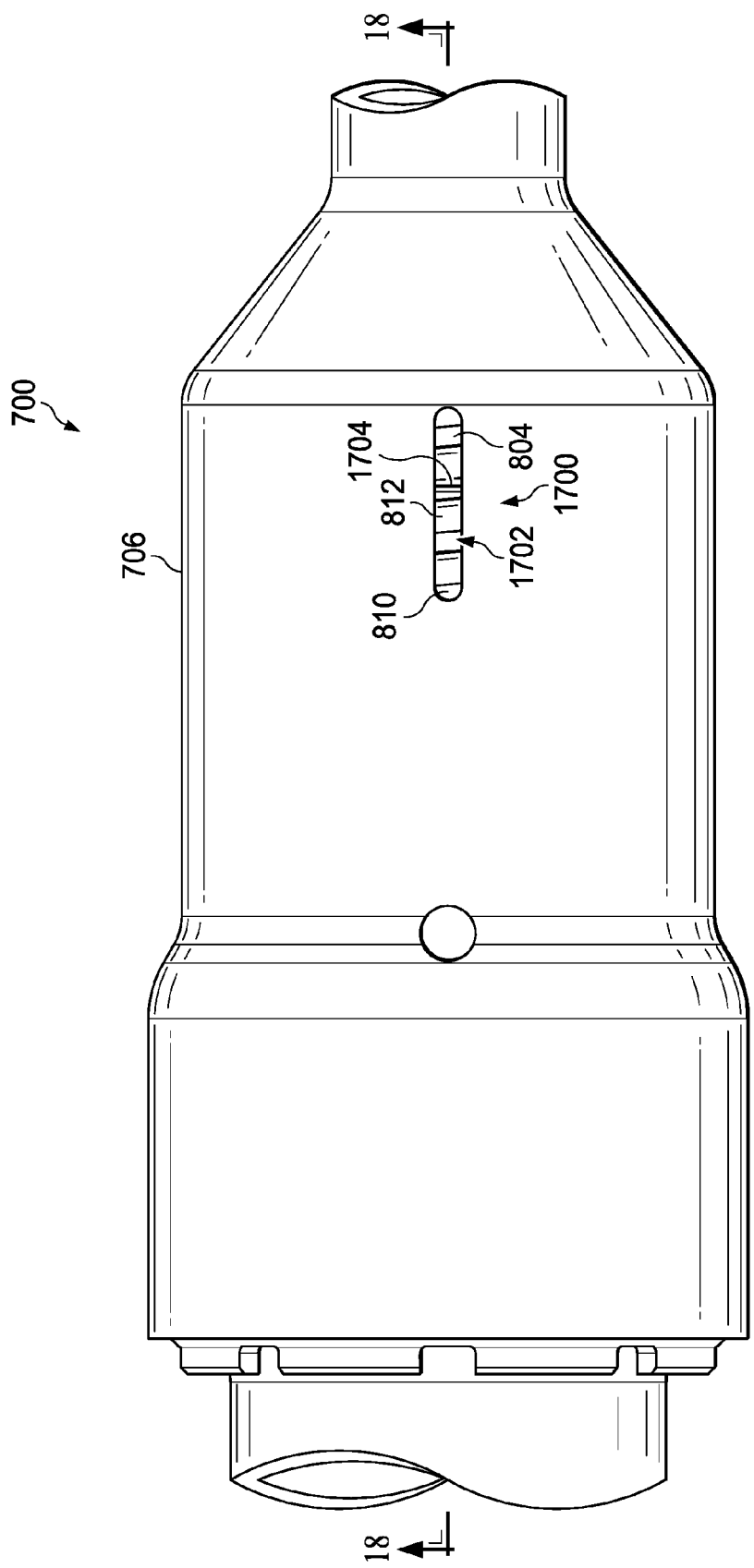
FIG. 17 is an illustration of a section of a housing of a dampening system in accordance with an illustrative embodiment.

Referring now to FIG. 17, an illustration of a section of a housing of a dampening system is depicted in accordance with an illustrative embodiment. In this depicted example, a view of second section 706 of housing 700 is shown in the direction of lines 17-17 in FIG. 7.

In this illustrative example, second section 706 of housing 700 has fluid indicator 1700. Fluid indicator 1700 represents the relationship between slot 1702 and the position of end 1704 of piston 810 in this illustrative example.

Slot 1702 exposes end 1704 of piston 810 within second compartment 902. A portion of rod 804 and spring 812 are also seen in this view.

Fluid indicator 1700 allows an operator to determine the position of piston 810 within second compartment 902. The position of piston 810 corresponds with an amount of hydraulic fluid 908 within dampening system 600. This amount of hydraulic fluid 908 may be a volume of hydraulic fluid 908. If the volume of hydraulic fluid 908 in dampening system 600 is less than desired, additional hydraulic fluid 908 may be added to the system. In some examples, more than one slot is present in second section 706 of housing 700 in case spring 812 blocks the view of end 1704 of piston 810 in slot 1702.

Figure 18:
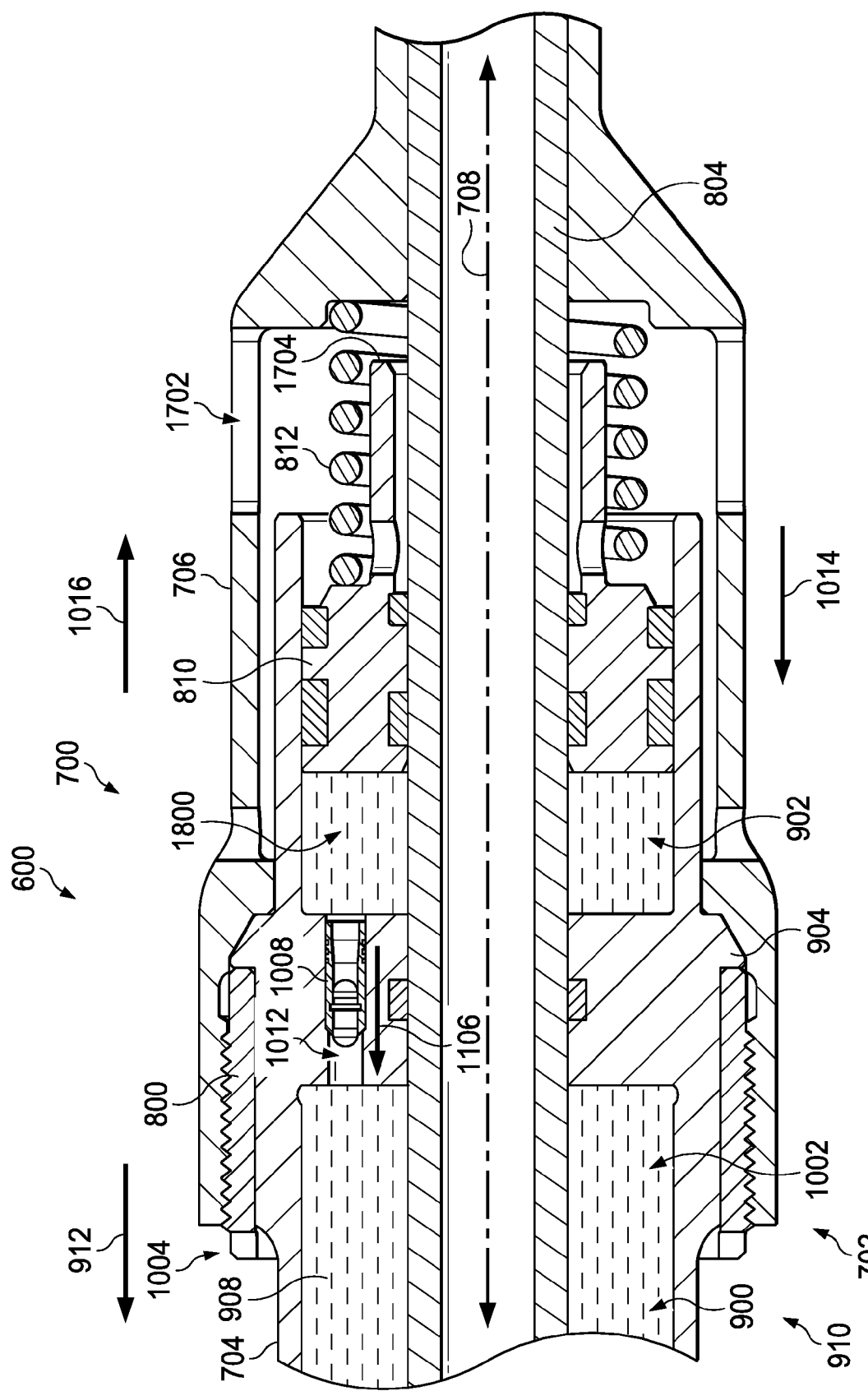
FIG. 18 is an illustration of a cross-sectional view of a section of a housing of a dampening system in accordance with an illustrative embodiment.

Turning now to FIG. 18, an illustration of a cross-sectional view of a section of a housing of a dampening system is depicted in accordance with an illustrative embodiment. In this depicted example, a cross-sectional view of second section 706 of dampening system 600 taken along lines 18-18 in FIG. 17 is shown.

As illustrated, second compartment 706 has volume 1800 of hydraulic fluid 908. When second compartment 902 has volume 1800 of hydraulic fluid 908, end 1704 of piston 810 is positioned relative to slot 1702 as shown in FIG. 17.

Hydraulic fluid 908 may flow into second chamber 1002 in first compartment 900 in the direction of arrow 1106 in this illustrative example. Spring 812 pushes piston 810 in the direction of arrow 1014 to move hydraulic fluid 908. Hydraulic fluid 908 freely flows through channel 1012 when moved by piston 810.

Figure 19:
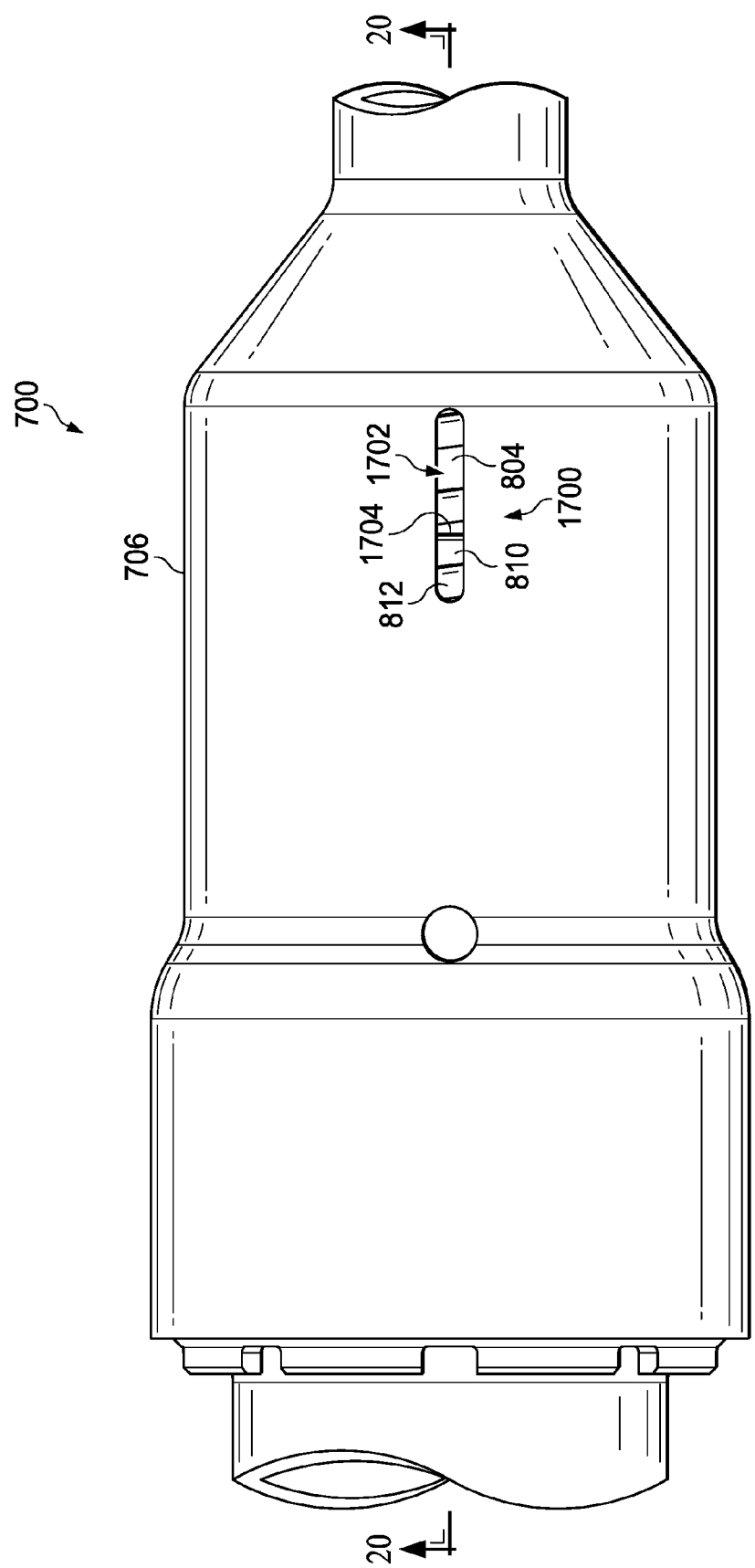
FIG. 19 is an illustration of a section of a housing of a dampening system in accordance with an illustrative embodiment.

With reference now to FIG. 19, an illustration of a section of a housing of a dampening system is depicted in accordance with an illustrative embodiment. In this depicted example, a view of second section 706 of housing 700 is shown.

As illustrated, end 1704 of piston 810 has moved in the direction of arrow 1014 in FIG. 18. End 1704 of piston 810 is seen in a different position relative to slot 1702. More of rod 804 is seen through slot 1702.

Figure 20:
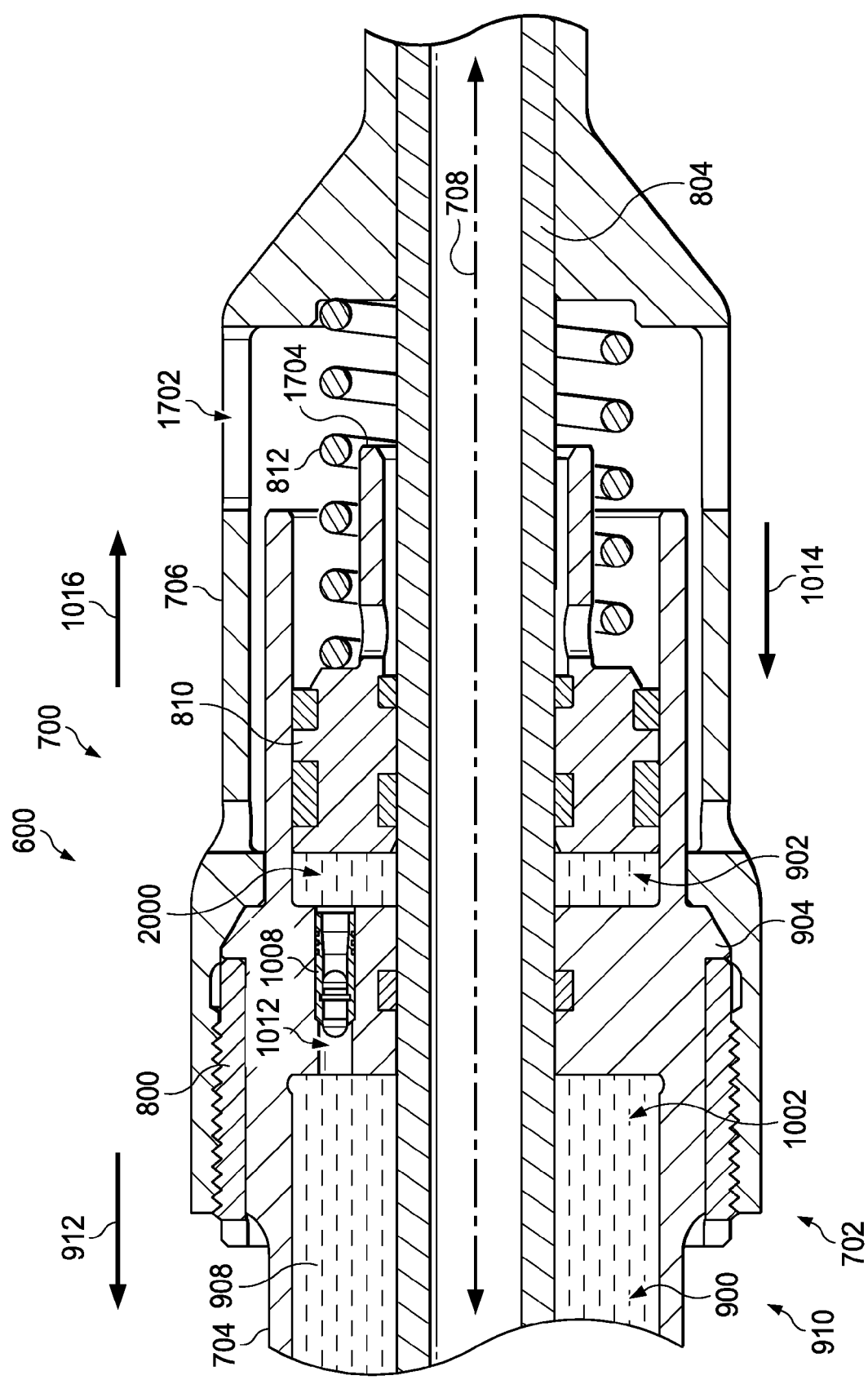
FIG. 20 is an illustration of a cross-sectional view of a section of a housing of a dampening system in accordance with an illustrative embodiment.

In FIG. 20, an illustration of a cross-sectional view of a section of a housing of a dampening system is depicted in accordance with an illustrative embodiment. In this depicted example, a cross-sectional view of second section 706 of dampening system 600 taken along lines 20-20 in FIG. 19 is shown.

In this illustrative example, second compartment 902 has volume 2000 of hydraulic fluid 908. Volume 2000 is less than volume 1800 shown in FIG. 18. When second compartment 902 has volume 2000 of hydraulic fluid 908, end 1704 of piston 810 is positioned relative to slot 1702 as shown in FIG. 17.

Figure 21:
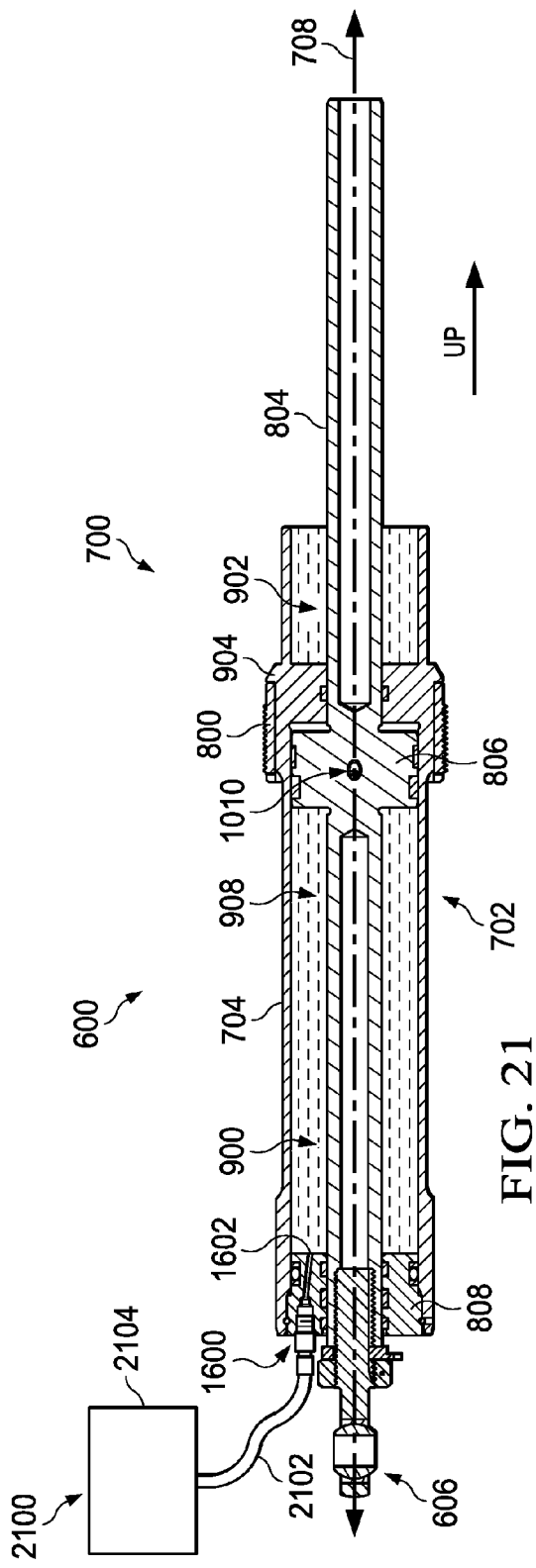
FIG. 21 is an illustration of a cross-sectional view of a dampening system in accordance with an illustrative embodiment.
Figure 22:
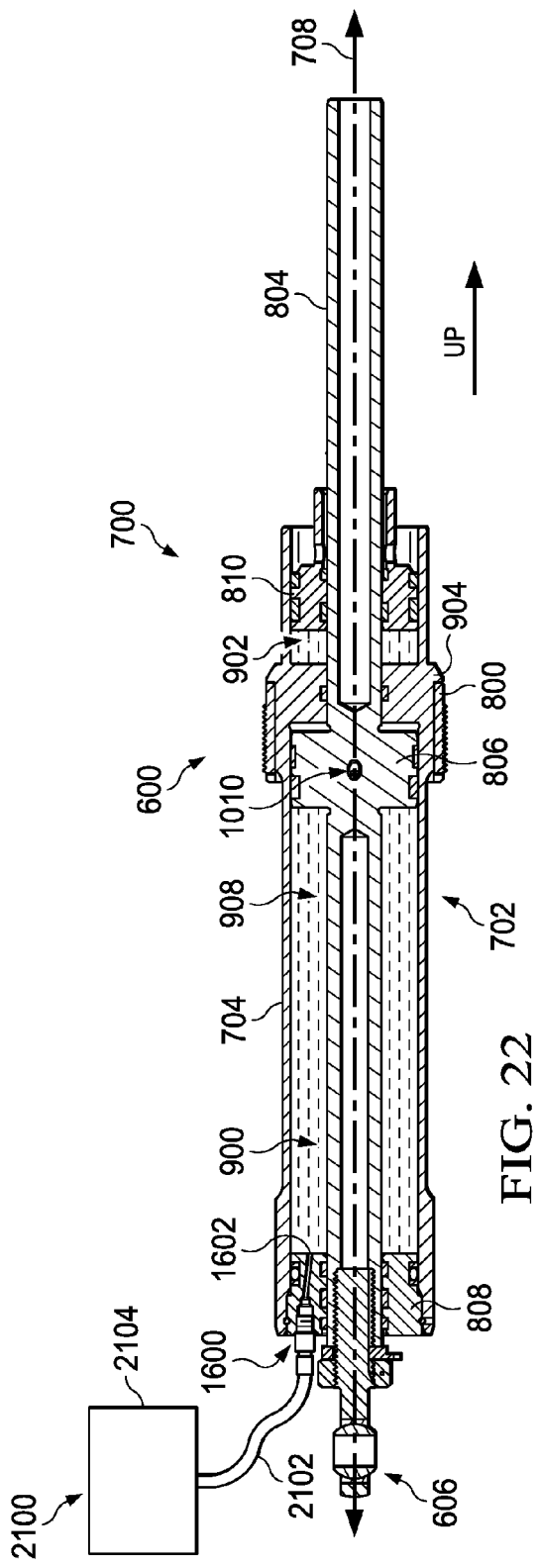
FIG. 22 is an illustration of a cross-sectional view of a dampening system in accordance with an illustrative embodiment.
Figure 23:
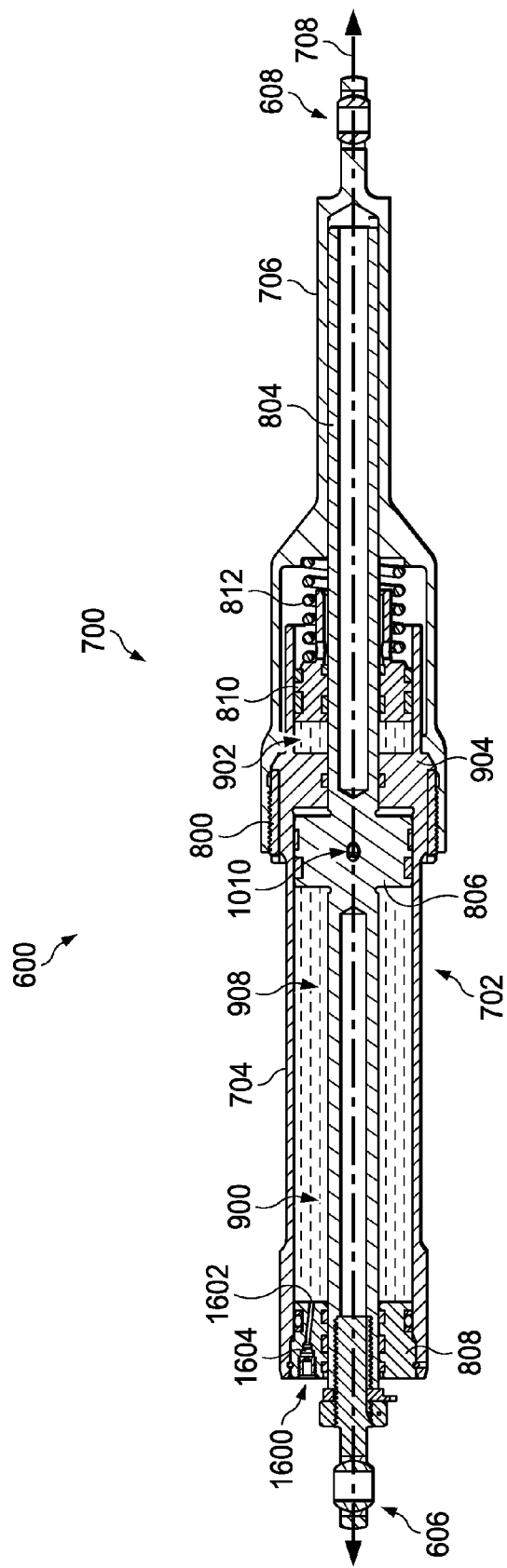
FIG. 23 is an illustration of a cross-sectional view of a dampening system in accordance with an illustrative embodiment.

FIGS. 21-23 depict the filling and assembly of a dampening system in accordance with an illustrative embodiment. FIG. 23 is a cross-sectional view of dampening system 600 taken along lines 23-23 in FIG. 7 is shown. FIGS. 21-22 show the progressive assembly of the final structure shown in FIG. 23.

In FIG. 21, first section 704 of housing 700 has been sealed using sealing system 808. Rod 804 and piston 806 are positioned in housing 700.

Plug 1604 has been removed from fill port 1600 and filling system 2100 has been connected to fill port 1600. In particular, fluid line 2102 has been connected to fill port 1600. In addition to fluid line 2102, filling system 2100 may include reservoir 2104, a valve (not shown), and other suitable components.

In this illustrative example, an operator uses fill port 1600 to fill first compartment 900 with hydraulic fluid 908. Hydraulic fluid 908 flows through channel 1010 in piston 806 into a portion of second compartment 902 until hydraulic fluid 908 fills second compartment 902.

Turning to FIG. 22, piston 810 has been positioned in housing 700. After placing piston 810 in contact with hydraulic fluid 908, the valve in filling system 2100 is positioned to return fluid to reservoir 2104.

As piston 810 is moved to the desired level of fluid quantity in the system, excess hydraulic fluid introduced during the filling process is returned to reservoir 2104 via fill port 1600. Fluid line 2102 is removed and then plug 1604 is inserted into fill port 1600. Seal friction between first section 704 of housing 700 and piston 810 and seal friction between rod 804 and piston 810 holds piston 810 in the desired position while fluid line 2102 is removed and plug 1604 is installed.

With reference to FIG. 23, second section 706 of housing 700 has been attached to first section 704 of housing 700. Spring 812 has been positioned between piston 810 and an end of second section 706 of housing 700. Spring 812 exerts a force on piston 810 to pressurize hydraulic fluid 908.

First section 704 and second section 706 of housing 700 have been secured with retaining nut 800. Dampening system 600 is now sealed and ready to be installed in aircraft 100 shown in FIG. 1.

The illustrations of dampening system 600 and the components within dampening system 600 in FIGS. 6-23 are not meant to imply physical or architectural limitations to the manner in which an illustrative embodiment may be implemented. Other components in addition to or in place of the ones illustrated may be used. Some components may be optional.

The different components shown in FIGS. 6-23 may be illustrative examples of how components shown in block form in FIGS. 2-3 can be implemented as physical structures. Additionally, some of the components in FIGS. 6-23 may be combined with components in FIGS. 2-3, used with components in FIGS. 2-3, or a combination of the two.

As an example, fluid indicator 1700 may include a sensor placed within second compartment 902 to determine a volume of hydraulic fluid 908 in second compartment 902. In another illustrative example, housing 700 may be fabricated in a single structure and assembled in a different manner than described with reference to FIGS. 21-23. In this case, retaining nut 800 may be omitted.

In still other illustrative examples, when a different type of fluid is used, flow regulator 1008 and flow regulator 1006 may be different types than shown in FIGS. 6-23. For instance, the restriction of flow in one or more directions may be adjusted based on the properties of the fluid used within dampening system 600.

Figure 24:
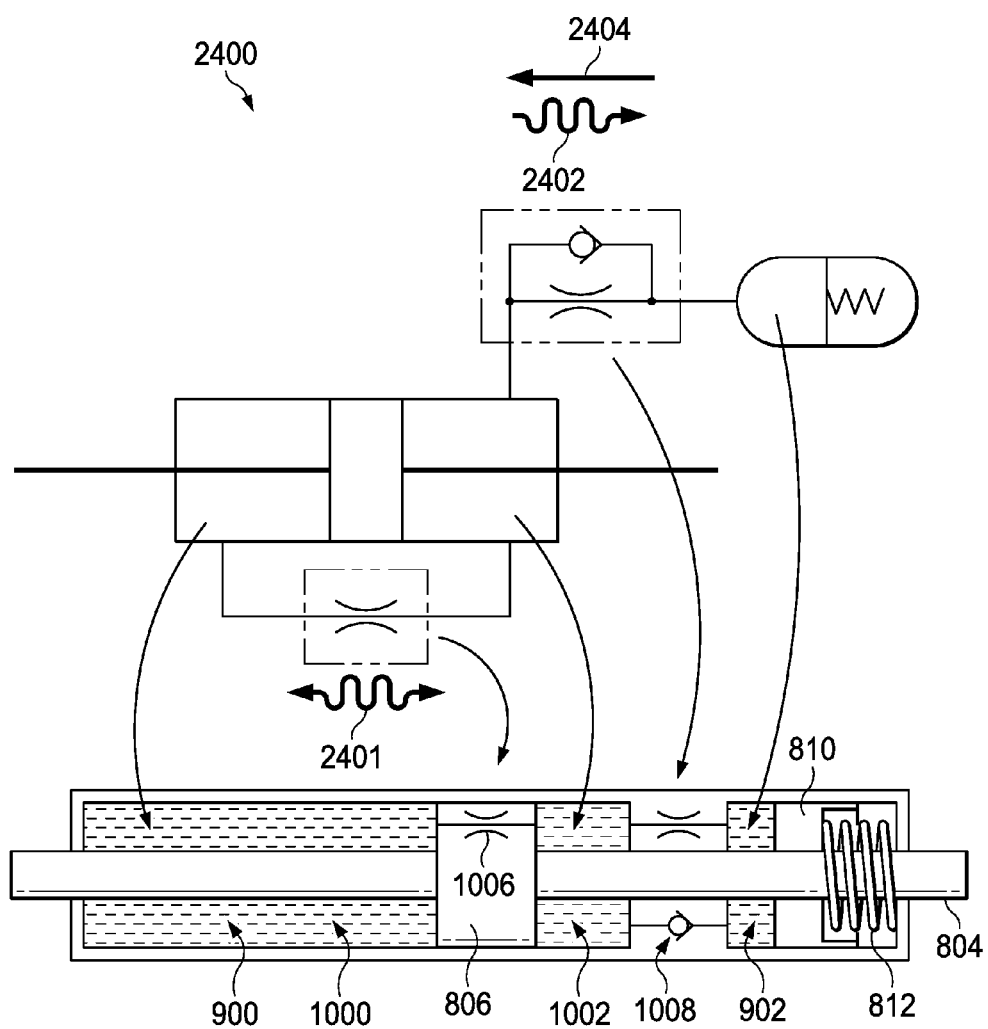
FIG. 24 is an illustration of a hydraulic schematic in accordance with an illustrative embodiment.

Turning next to FIG. 24, an illustration of a hydraulic schematic is depicted in accordance with an illustrative embodiment. Hydraulic schematic 2400 represents fluid flow within dampening system 600 as described in FIGS. 6-23.

As seen in this view, fluid flow is restricted between first chamber 1000 and second chamber 1002 in both directions, as indicated by arrow 2401. Fluid flow is restricted in the direction of arrow 2402 into second compartment 902. Fluid flows freely from second compartment 902, as indicated by arrow 2404 in this illustrative example.

In this illustrative example, flow restriction in the direction of arrow 2401 has a liquid resistance of about 1300 liquid ohms (lohms). Flow restriction in the direction of arrow 2402 has a liquid resistance of about 20,000 lohms. In this manner, flow restriction in the direction of arrow 2402 is about 15.4 times more restrictive than in the direction of 2401. During compression, the equivalent single orifice flow restriction for fluid leaving second chamber 1002 is 1221 lohms=(1/($\frac{1}{1300}$+$\frac{1}{20000}$)). Therefore, for a given externally applied force, extension will be slightly slower than compression.

Figure 25:
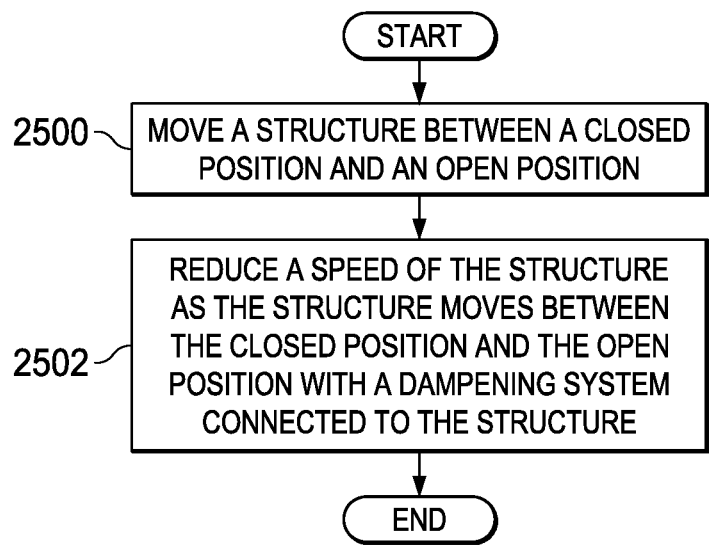
FIG. 25 is an illustration of a flowchart of a process for dampening a structure in an aircraft in accordance with an illustrative embodiment.

With reference now to FIG. 25, an illustration of a flowchart of a process for dampening a structure in an aircraft is depicted in accordance with an illustrative embodiment. The process described in FIG. 25 may be implemented to reduce speed 216 of structure 204 of aircraft 202 as structure 204 moves between closed position 206 and open position 208 in dampening environment 200 shown in block form in FIG. 2.

The process begins by moving a structure between a closed position and an open position (operation 2500). The process then reduces a speed of the structure as the structure moves between the closed position and the open position with a dampening system connected to the structure (operation 2502), with the process terminating thereafter.

Figure 26:
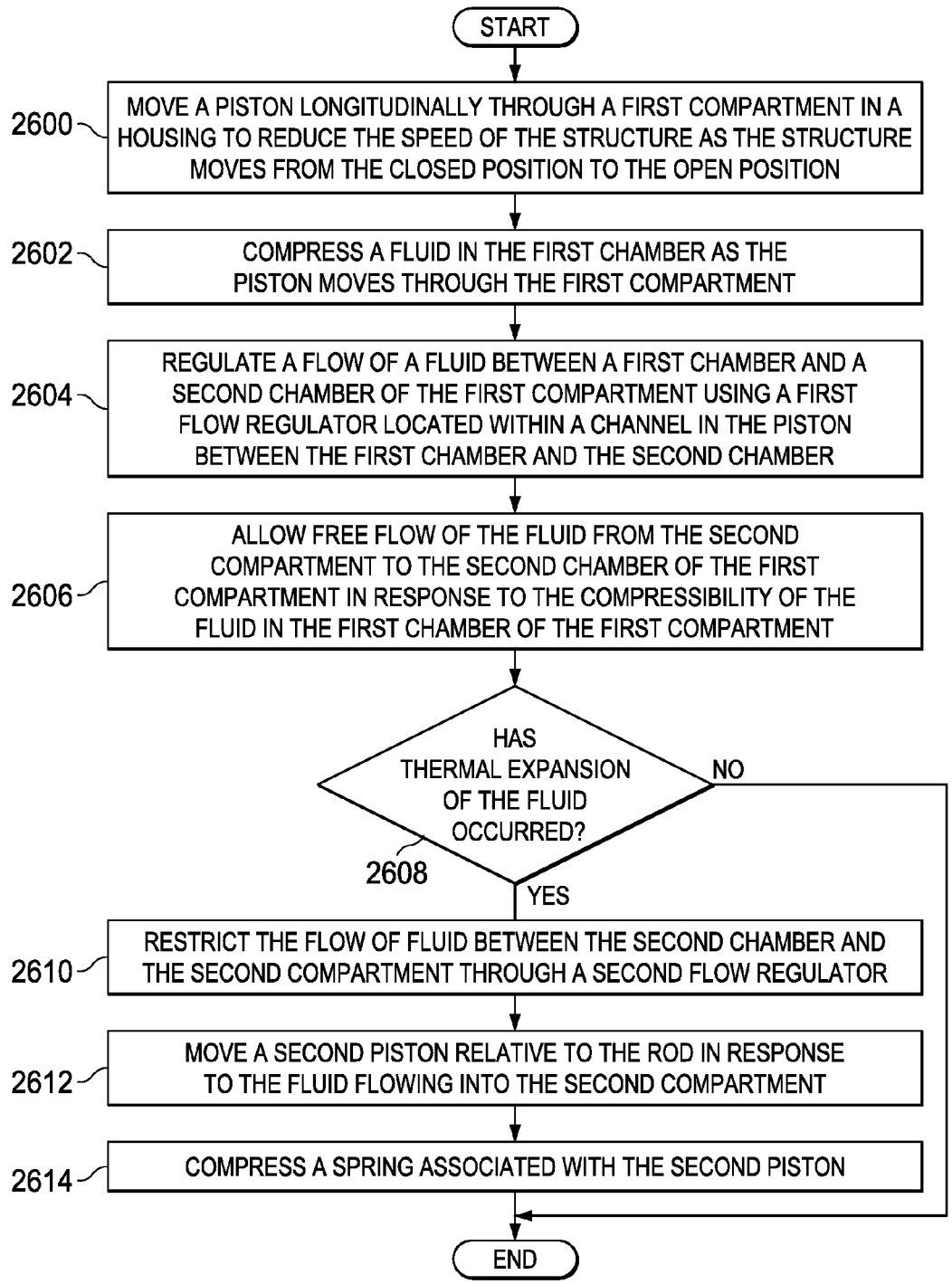
FIG. 26 is an illustration of a flowchart of a process for reducing the speed of a structure in an aircraft in accordance with an illustrative embodiment.

Turning next to FIG. 26, an illustration of a flowchart of a process for reducing the speed of a structure in an aircraft is depicted in accordance with an illustrative embodiment. The process described in FIG. 26 may be implemented to reduce speed 216 of structure 204 of aircraft 202 during operation 2502 shown in FIG. 25 as structure 204 moves from closed position 206 to open position 208.

The process begins by moving a piston longitudinally through a first compartment in a housing to reduce the speed of the structure as the structure moves from the closed position to the open position (operation 2600). The process then compresses a fluid in the first chamber as the piston moves through the first compartment (operation 2602).

Next, as the piston moves, the process regulates a flow of a fluid between a first chamber and a second chamber of the first compartment using a first flow regulator located within a channel in the piston between the first chamber and the second chamber (operation 2604). The process then allows free flow of the fluid from the second compartment to the second chamber of the first compartment in response to the compression of the fluid in the first chamber of the first compartment (operation 2606).

Next, after the structure has moved to the open position, a determination is made as to whether thermal expansion of the fluid has occurred (operation 2608). Thermal expansion may occur as the fluid is forced through the first flow regulator. Specifically, as fluid is forced through the first flow regulator, work is being converted to heating the fluid such that at rest, the heated fluid has an expanded volume. Operation 2608 occurs after extension of the rod has stopped.

If thermal expansion has occurred, the system accommodates for thermal expansion. The process restricts the flow of fluid between the second chamber and the second compartment through a second flow regulator (operation 2610). If thermal expansion has not occurred, the process terminates.

The process moves a second piston relative to the rod in response to the fluid flowing into the second compartment (operation 2612). The process then compresses a spring associated with the second piston (operation 2614) with the process terminating thereafter.

In some cases, fluid will move back and forth between compartments until the system reaches equilibrium. This action occurs as the fluid expands (i.e., increases in volume) from heat and then contracts (i.e., decreases in volume) as it cools to ambient temperature. For example, fluid may flow back into the second chamber after cooling of the fluid to ambient temperature until a desired amount of fluid is retained in the first compartment.

Figure 27:
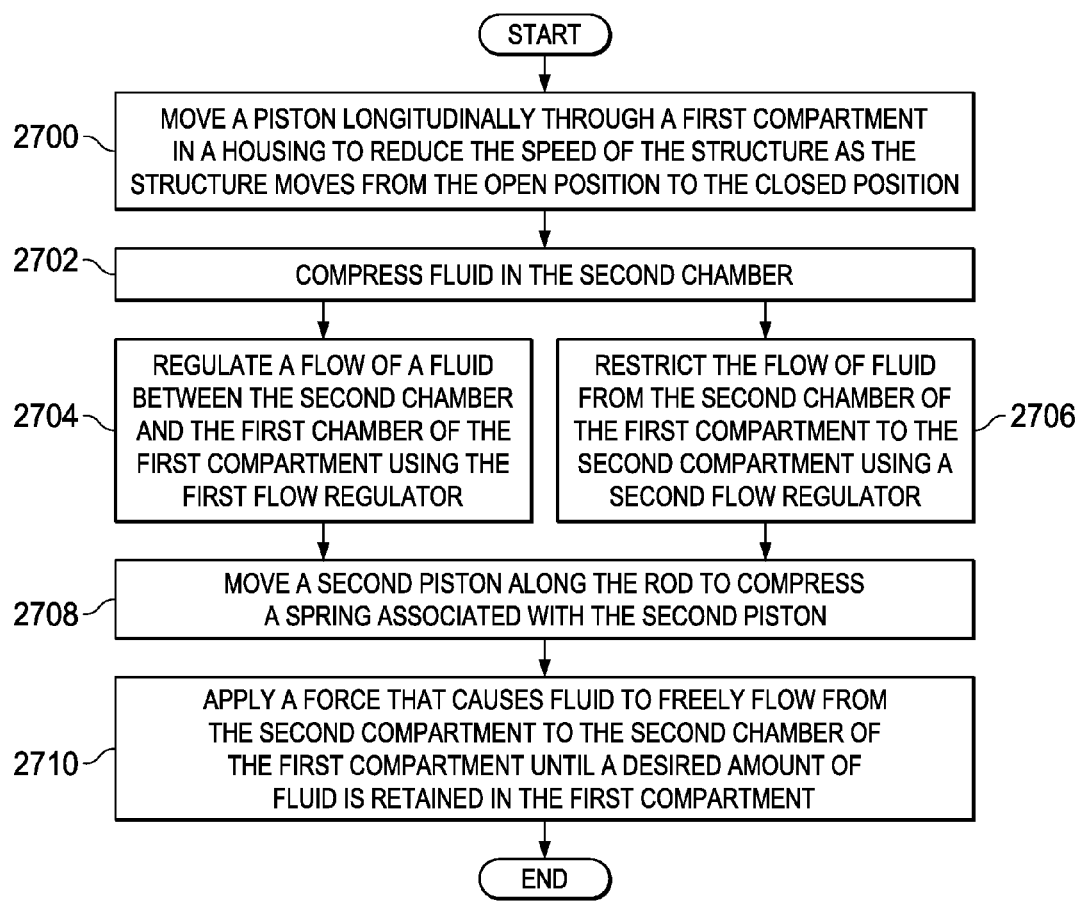
FIG. 27 is an illustration of a flowchart of a process for reducing the speed of a structure in an aircraft in accordance with an illustrative embodiment.

In FIG. 27, an illustration of a flowchart of a process for reducing the speed of a structure in an aircraft is depicted in accordance with an illustrative embodiment. The process described in FIG. 27 may be implemented to reduce speed 216 of structure 204 of aircraft 202 during operation 2502 shown in FIG. 25 as structure 204 moves from open position 208 to closed position 206.

The process begins by moving a piston longitudinally through a first compartment in a housing to reduce the speed of the structure as the structure moves from the open position to the closed position (operation 2700). Fluid in the second chamber is compressed (operation 2702).

Next, the process regulates a flow of a fluid between the second chamber and the first chamber of the first compartment using the first flow regulator (operation 2704). The process also restricts the flow of fluid from the second chamber of the first compartment to the second compartment using a second flow regulator (operation 2706). Fluid flows into the second compartment in response to the compression of the fluid in the second chamber. In this manner, when fluid is compressed in the second chamber, the fluid flows through both openings in communication with the second chamber.

Next, the second piston moves along the rod to compress a spring associated with the second piston (operation 2708). When the structure is in the closed position and the rod is retracted, a force applied by the spring causes fluid to freely flow from the second compartment to the second chamber of the first compartment until a desired amount of fluid is retained in the first compartment (operation 2710) with the process terminating thereafter.

The process described in FIGS. 26-27 also may be used to accommodate thermal expansion and contraction of the fluid. In particular, as thermal expansion occurs, fluid will be forced into the second compartment, thus causing the second piston to compress the spring. As contraction occurs, the spring will exert a force on the second piston to drive the fluid back into the first compartment.

Figure 28:
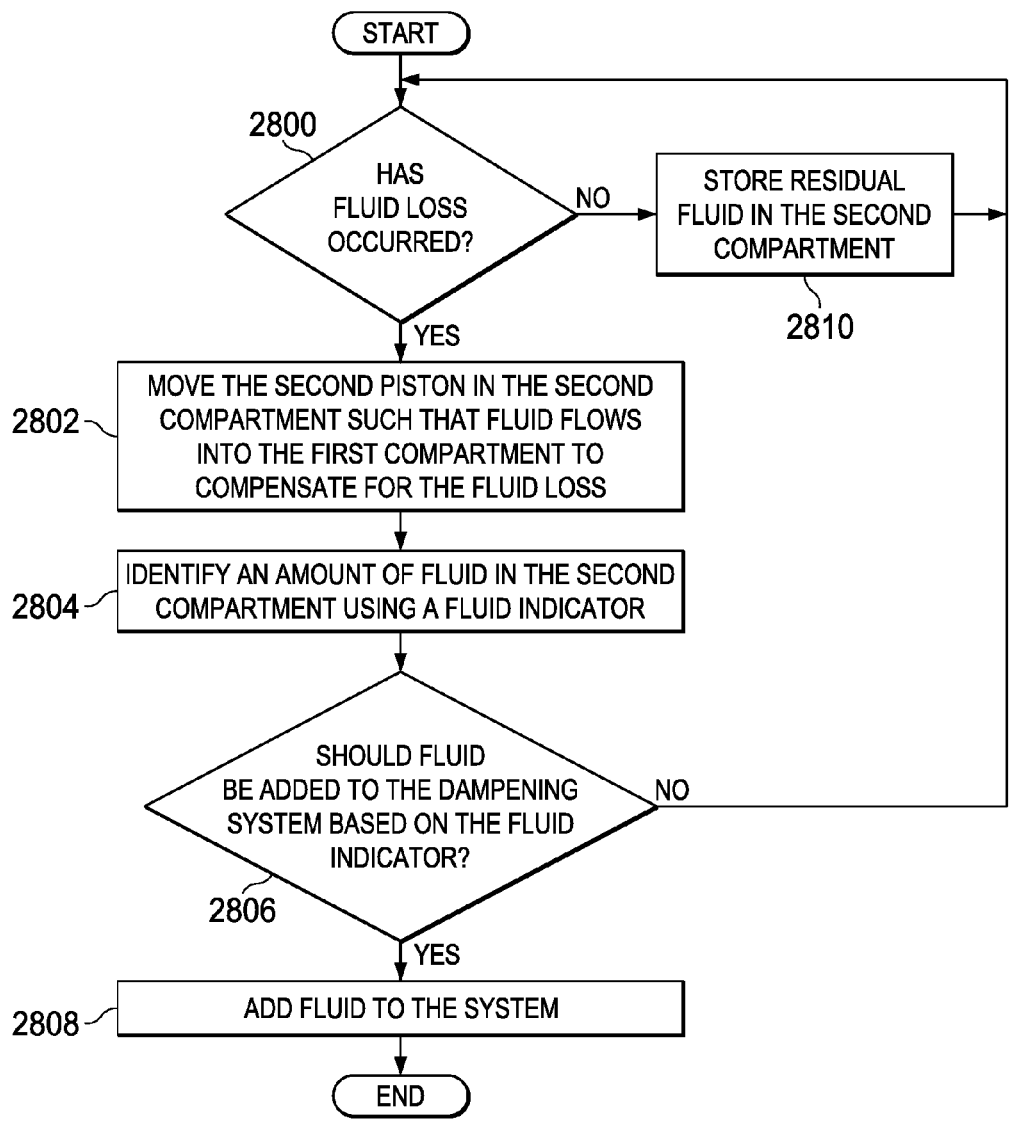
FIG. 28 is an illustration of a flowchart of a process for compensating for fluid loss of a dampening system in accordance with an illustrative embodiment.

Referring next to FIG. 28, an illustration of a flowchart of a process for compensating for fluid loss of a dampening system is depicted in accordance with an illustrative embodiment. The process described in FIG. 28 may be implemented to compensate for fluid loss 346 in dampening system 218 in FIG. 3.

The process begins by determining whether fluid loss has occurred (operation 2800). If fluid loss has occurred, the process moves the second piston in the second compartment such that fluid flows into the first compartment to compensate for the fluid loss (operation 2802). In this illustrative example, fluid 316 may flow through second flow regulator 358.

Next, the process identifies an amount of fluid in the second compartment using a fluid indicator (operation 2804). A determination is then made as to whether fluid should be added to the dampening system based on the fluid indicator (operation 2806). If fluid should be added, the process adds fluid to the system (operation 2808) with the process terminating thereafter. If fluid should not be added to the dampening system, the process returns to operation 2800.

Returning to operation 2800, if fluid loss has not occurred, the process stores residual fluid in the second compartment (operation 2810), and returns to operation 2800 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 2900 as shown in FIG. 29 and aircraft 3000 as shown in FIG. 30. Turning first to FIG. 29, an illustration of a block diagram of an aircraft manufacturing and service method is depicted in accordance with an illustrative embodiment. During pre-production, aircraft manufacturing and service method 2900 may include specification and design 2902 of aircraft 3000 in FIG. 30 and material procurement 2904.

During production, component and subassembly manufacturing 2906 and system integration 2908 of aircraft 3000 in FIG. 30 takes place. Thereafter, aircraft 3000 in FIG. 30 may go through certification and delivery 2910 in order to be placed in service 2912. While in service 2912 by a customer, aircraft 3000 in FIG. 30 is scheduled for routine maintenance and service 2914, which may include modification, reconfiguration, refurbishment, and the like.

Each of the processes of aircraft manufacturing and service method 2900 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 30, an illustration of a block diagram of an aircraft is depicted in which an illustrative embodiment may be implemented. In this example, aircraft 3000 is produced by aircraft manufacturing and service method 2900 in FIG. 29 and may include airframe 3002 with plurality of systems 3004 and interior 3006. Examples of systems 3004 include one or more of propulsion system 3008, electrical system 3010, hydraulic system 3012, and environmental system 3014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2900 in FIG. 29. In particular, dampening system 218 from FIGS. 2-3 may be installed in aircraft 202 during any one of the stages of aircraft manufacturing and service method 2900. For example, without limitation, dampening system 218 from FIGS. 2-3 may be installed during at least one of component and subassembly manufacturing 2906, system integration 2908, routine maintenance and service 2914, or some other stage of aircraft manufacturing and service method 2900. Further, dampening system 218 may be used to reduce the speed of a door in aircraft 3000 during in-service 2912. In still other illustrative examples, dampening system 218 is tested during certification and delivery 2910.

In one illustrative example, components or subassemblies produced in component and subassembly manufacturing 2906 in FIG. 29 may be fabricated or manufactured in a manner similar to components or subassemblies produced while aircraft 3000 is in service 2912 in FIG. 29. As yet another example, one or more apparatus embodiments, method embodiments, or a combination thereof may be utilized during production stages, such as component and subassembly manufacturing 2906 and system integration 2908 in FIG. 29. One or more apparatus embodiments, method embodiments, or a combination thereof may be utilized while aircraft 3000 is in service 2912, during maintenance and service 2914 in FIG. 29, or a combination thereof. The use of a number of the different illustrative embodiments may substantially expedite the assembly, reduce the cost of aircraft 3000, or both.

Thus, the illustrative embodiments provide a method and apparatus for dampening structure 204 in aircraft 202. Dampening system 218 comprises housing 300 having elongate shape 302, first compartment 312, second compartment 314, first piston 322, rod 328, and second piston 336. First compartment 312 is located along axis 310 extending centrally through housing 300. Second compartment 314 is located adjacent to first compartment 312 on axis 310 extending centrally through housing 300. First piston 322 is located within first compartment 312. First piston 322 defines first chamber 324 and second chamber 326 of first compartment 312 as first piston 322 moves within housing 300. Rod 328 is associated with first piston 322 and extends centrally through first compartment 312 and second compartment 314. Second piston 336 is coaxial to first piston 322 and located within second compartment 314 of housing 300. Second piston 336 moves relative to rod 328 to accommodate for a flow of fluid 316 into second compartment 314. Additionally, second piston 336 moves to accommodate for thermal expansion 338, thermal contraction 340, and fluid loss 346 of fluid 316.

With the use of dampening system 218, speed 216 of door 210 in aircraft 202 is reduced. As a result, dampening system 218 may increase the lifetime of door 210, structures attached to door 210, and a hinge system. Dampening system 218 also may reduce injury for operators. The adjacent configuration for fluid compartments within dampening system 218 decreases the amount of space needed for dampening system 218. Features of dampening system 218 are combined in one housing, instead of coplanar systems that take up additional space in aircraft 202. This space is reduced without compromising performance of the system.

Additionally, second compartment 314 serves as both a thermal expansion reservoir and a reservoir for residual hydraulic fluid. In this manner, second compartment 314 may be partially filled with hydraulic fluid to compensate for fluid loss during use of dampening system 218. As a result, the frequency at which dampening system 218 is refilled with hydraulic fluid will decrease and the life of dampening system 218 will be extended.

Second compartment 314 accommodates for thermal expansion and contraction of the hydraulic fluid such that first compartment 312 has a desired amount of fluid during use of the system. Fluid can flow between compartments such that dampening system 218 performs as desired, having a desired amount of fluid in first compartment 312 at all times. As a result, dampening system 218 may be used in varying environmental conditions encountered by aircraft 202.

Moreover, fluid indicator 348 allows an operator to determine the amount of fluid in second compartment 314 without disassembling dampening system 218. In this manner, dampening system 218 may be refilled only when needed and prevent unnecessary disassembly or rework of the system.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. An apparatus that comprises:
 a housing that comprises an elongate shape that comprises a first compartment and a second compartment, each compartment located concentrically about an axis that extends centrally through a length of the housing, such that each compartment abuts an interface that separates the first compartment from the second compartment;
 a first piston located within the first compartment of the housing, wherein the first piston defines a first chamber and a second chamber of the first compartment as the first piston moves within the housing;
 a rod fixed to the first piston such that the rod extends centrally through the second chamber and the second compartment; and
 a second piston coaxial to the first piston and located within the second compartment of the housing, the second piston configured to move along the rod, and thereby change a distance, between the interface and the second piston, that defines a volume for the second compartment, and accommodate a flow of a fluid from the second chamber into the second compartment, the interface being distinct from either piston.

2. The apparatus of claim 1 further comprising:
 a spring that connects the second piston to a second section of the housing that overlaps a first section of the housing that comprises the first compartment, wherein the spring applies a force against the second piston.

3. The apparatus of claim 2, wherein the force from the spring moves the fluid in the second compartment to the first compartment to compensate for a fluid loss of the apparatus.

4. The apparatus of claim 1 further comprising:
a fluid regulation system having a first flow regulator located in a channel in the first piston between the first chamber and the second chamber, and a second flow regulator located in a channel in the interface between the second chamber and the second compartment, the first flow regulator being a bi-directional restrictor configured to slow a speed at which the first piston moves through the first compartment.

5. The apparatus of claim 4, further comprising a flow regulation property of the first flow regulator being determined by the fluid being water.

6. The apparatus of claim 1 further comprising:
a sealing system located on an end of the housing, wherein the sealing system includes a shearwire retaining device.

7. The apparatus of claim 6 further comprising:
a fill port located within the interface, wherein the fill port comprises a channel in communication with the first compartment; and
a plug associated with the fill port.

8. The apparatus of claim 1 further comprising:
a fluid indicator that comprises a slot in the housing, the slot configured such that the slot exposes a portion of the second piston and wherein the portion indicates an amount of the fluid in the second compartment.

9. The apparatus of claim 1, wherein the second compartment accommodates thermal expansion of the fluid.

10. The apparatus of claim 1, wherein the housing comprises:
a first section;
a second section attached to the first section; and
a retaining nut attaching the first section to the second section.

11. A method for dampening a structure in an aircraft, the method comprising:
moving the structure between a closed position and an open position; and
reducing a speed of the structure as the structure moves between the closed position and the open position with a dampening system connected to the structure, the dampening system comprising:
a housing comprising an elongate shape;
a first compartment; and a second compartment, each compartment located concentrically about an axis extending centrally through a length of the housing, each compartment abutting an interface separating the first compartment from the second compartment;
a first piston located within the first compartment of the housing, wherein the first piston defines a first chamber and a second chamber of the first compartment as the first piston moves within the housing;
a rod fixed to the first piston and extending longitudinally through the second chamber and the second compartment; and
a second piston coaxial to the first piston and located within the second compartment of the housing, the second piston moving the rod and thereby changing a distance, between the interface and the second piston, defining a volume for the second compartment, and accommodating a flow of a fluid from the second chamber into the second compartment, the interface being distinct from either piston.

12. The method of claim 11 further comprising:
storing the fluid in the second compartment; and
moving the fluid from the second compartment to the first compartment to compensate for a fluid loss of the dampening system.

13. The method of claim 11 further comprising:
determining, using a fluid indicator, an amount of the fluid in the second compartment.

14. The method of claim 11, wherein the housing has a first section and a second section and further comprising:
positioning the second piston relative to the rod;
positioning the second section of the housing coaxial to the first section to form the second compartment; and
attaching the first section to the second section to form the dampening system.

15. The method of claim 11 further comprising:
moving the fluid from the first compartment to the second compartment to accommodate thermal expansion of the fluid.

16. A dampening system for a door of an aircraft comprising:
a housing that comprises an elongate shape that comprises a first compartment and a second compartment, each compartment located concentrically about an axis that extends centrally through a length of the housing, such that each compartment abuts an interface that separates the first compartment from the second compartment;
a first piston located within the first compartment of the housing, wherein the first piston defines a first chamber and a second chamber of the first compartment as the first piston moves within the housing;
a rod fixed to the first piston such that the rod extends centrally through the second chamber and the second compartment; and
a second piston coaxial to the first piston and located within the second compartment of the housing, the second piston configured to move along the rod, and thereby change a distance, between the interface and the second piston, that defines a volume for the second compartment, and accommodate a flow of a fluid from the second chamber into the second compartment, the interface being distinct from either piston.

17. The dampening system of claim 16, wherein the first piston moves longitudinally through the first compartment to reduce a speed of the door as the door moves between a closed position and an open position.

18. The dampening system of claim 16 further comprising:
a sealing system having a shearwire retaining device, wherein the sealing system is located on an end of the housing.

19. The dampening system of claim 16 further comprising:
a fluid regulation system having a first flow regulator located in a channel in the piston between the first chamber and the second chamber, and a second flow regulator located in a channel in the interface between the second chamber and the second compartment, the first flow regulator being a bi-directional restrictor configured to slow a speed at which the first piston moves through the first compartment.

20. The dampening system of claim 16, wherein the door is an access door.

* * * * *